(12) United States Patent
Parekh

(10) Patent No.: US 10,793,722 B2
(45) Date of Patent: Oct. 6, 2020

(54) ORGANIC-INORGANIC HYBRID POLYMER LATEX FOR HIGH DURABLE TRAFFIC MARKING PAINT

(71) Applicant: PIDILITE INDUSTRIES LIMITED, Mumbai (IN)

(72) Inventor: Madhukar Balvantray Parekh, Mumbai (IN)

(73) Assignee: PIDILITE INDUSTRIES LIMITED, Mumbai (IN)

( * ) Notice: Subject to any disclaimer, the term of this patent is extended or adjusted under 35 U.S.C. 154(b) by 312 days.

(21) Appl. No.: 15/728,995

(22) Filed: Oct. 10, 2017

(65) Prior Publication Data

US 2019/0048206 A1   Feb. 14, 2019

(30) Foreign Application Priority Data

Aug. 9, 2017   (IN) .............................. 201721028295

(51) Int. Cl.

| | |
|---|---|
| C09D 5/00 | (2006.01) |
| C09D 5/33 | (2006.01) |
| C08F 220/14 | (2006.01) |
| C08F 292/00 | (2006.01) |
| C09D 7/40 | (2018.01) |
| C09D 5/02 | (2006.01) |
| C09D 151/10 | (2006.01) |
| C09D 7/61 | (2018.01) |
| C08L 33/12 | (2006.01) |
| C09D 133/12 | (2006.01) |
| E01C 23/20 | (2006.01) |
| C08K 3/22 | (2006.01) |
| C08K 3/36 | (2006.01) |

(52) U.S. Cl.
CPC ............ *C09D 5/004* (2013.01); *C08F 220/14* (2013.01); *C08F 292/00* (2013.01); *C08L 33/12* (2013.01); *C09D 5/022* (2013.01); *C09D 7/61* (2018.01); *C09D 7/67* (2018.01); *C09D 133/12* (2013.01); *C09D 151/10* (2013.01); *E01C 23/20* (2013.01); *C08K 3/22* (2013.01); *C08K 3/36* (2013.01)

(58) Field of Classification Search
CPC . C09D 5/022; C09D 5/04; C09D 7/61; C09D 7/67; C09D 133/12; C09D 151/10; C08F 220/14; C08F 292/00; E01C 23/20
See application file for complete search history.

(56) References Cited

U.S. PATENT DOCUMENTS

| 6,759,478 B2 | 7/2004 | Anderson et al. |
| 7,235,595 B2 | 6/2007 | Hermes et al. |

FOREIGN PATENT DOCUMENTS

| CN | 1070900 C | 9/2001 |
| CN | 101235232 B | 5/2012 |
| KR | 101050507 B1 | 7/2011 |
| WO | 2001060929 A2 | 8/2001 |

OTHER PUBLICATIONS

CN 101235232 machine translation. (Year: 2008).*

* cited by examiner

*Primary Examiner* — Edward J Cain
(74) *Attorney, Agent, or Firm* — Shumaker, Loop & Kendrick, LLP

(57) ABSTRACT

Disclosed is a hybrid polymer latex, a coating composition that can be used for traffic markings, transportation and signages. The coating composition includes polymerization products of organic monomers and a nanoparticulate dispersion of inorganic components, which are associated through covalent or coordinate bonds with the polymer such that there is homogenous integration and association of the modified inorganic component with the organic fraction in the polymer latex which increases abrasion properties of the coating composition. Additionally, the composition discloses additives in the form of polyfunctional amines which provide superior qualities of moisture proofing, water repellence and early rain resistance to enhance durability of the product. The present invention also includes processes and methods of preparing the hybrid polymer latex for coating composition.

8 Claims, 13 Drawing Sheets

ORGANIC-INORGANIC HYBRID POLYMER LATEX FOR HIGH DURABLE TRAFFIC MARKING PAINT

CROSS-REFERENCE TO RELATED APPLICATIONS AND PRIORITY

The present application claims priority from the Indian patent application number 201721028295 filed on Aug. 9, 2017.

TECHNICAL FIELD

The present invention is directed to coating compositions and particularly to hybrid organic-inorganic polymer latexes used in traffic marking paints for a plurality of applications on road surfaces.

BACKGROUND

Roads, airport runways, bridges, railway crossings etc. need to contain certain markings, usually executed through paints. These transportation surfaces are marked for lane markings, pedestrian crossings, directional markings and other markings which serve multiple purposes. On the one hand, this helps to control the flow of traffic while on the other it averts collision dangers. Further, the said traffic markings also act as safety markings to provide information to the vehicle operator. With such an important role in maintaining order on roads, runways and other transportation surfaces, these markings need to be highly durable so as to be visible to the driver under different weather conditions like high humidity, ultra-violet ray exposure, heavy rainfall etc.

In the previous art, traffic markings for roads and other surfaces have been produced using a high percentage organic binders. However, solvent-based organic coating materials are associated with various issues. Firstly, pure solvent based organic coatings tend to degrade faster upon exposure to high humidity, heavy rainfall and upon exposure to ultra-violet rays, and this greatly decreases their life-span requiring the traffic markings to be replaced within shortened spans of time. Secondly, pure solvent based organic coatings are associated with the release of volatile organic compound(s) (VOC) into the atmosphere, which is environmentally unsustainable due to its catastrophic impact on the protective ozone layer of the earth. Thirdly, many such organic moieties are photo-sensitive and undergo rapid degradation. For e.g. polystyrene (PS), one of the most important materials in the modern plastic industry, having been used all over the world due to its excellent physical properties and low-cost, however, when polystyrene is subjected to UV irradiation in the presence of air, it undergoes a rapid yellowing and a gradual embrittlement (Yousif E., and Haddad, R, *Springerplus*. 2013; 2: 398).

In the state of art, coating compositions with thermoplastic binders have been utilized on a commercial scale for traffic markings as an alternative to solvent-based organic binders due to absence of VOC. However, the application range covering the suitability of these thermoplastic coating compositions is limited and the application of paints having thermoplastic binders is rather difficult because it requires heating and spreading the paints during application of the paints.

In the state of art, the use of inorganic binders for coating compositions has been disclosed. Such inorganic coating materials can be produced with good adhesion properties, high crack resistance, fire resistance, weather resistance and high gloss. Various ingredients can be used to produce aqueous viscous inorganic binder formulation which further hardens the inorganic coating material along with the use of a crosslinking agent and water and silica based binder of an alkali metal silicate is a popular choice. However, these inorganic-based materials do not possess the desired properties for traffic markings and are brittle and inflexible which defeats the visual and structural integrity of the markings and are therefore not fit for this purpose. Further, the accumulation of dirt and yellowing of the paint composition over the course of time decreases their visibility and usefulness.

In the state of the art, the use of some hybrid polymers of organic and inorganic moieties have been disclosed. However, such hybrid latexes suffer from various shortcomings. Firstly, the mode of preparation of such hybrid coatings is such that the polymer hybrid is not formed in situ but rather separately prepared and does not allow homogenous integration and association of the inorganic moiety in the polymer resulting in paints with shorter durability and resultantly such paints are unsustainable in the long run.

Therefore, what is needed is a durable, environmentally friendly and cost-effective polymer latex for wide scale and diverse application(s) across a plurality of traffic markings. Thus, disclosed is an organic—inorganic hybrid coating composition is that is durable, easy to apply and stable over an enhanced period of time for traffic and road markings and at the same time is environmentally friendly which may solve long pressing need.

SUMMARY

This summary is provided to introduce aspects related to development of a polymer latex comprising an organic-inorganic hybrid composition to be used as high durable traffic marking. This summary is not intended to limit or restrict the scope of the innovation.

Disclosed is an organic-inorganic hybrid polymer latex coating composition for traffic and road markings, which overcomes the problems in the prior art. The coating composition of the invention has excellent physical properties which better enable the composition to withstand mechanical and climatic factors like sheer force, vehicle load, rainfall, humidity, extreme sunlight etc. making it an extremely viable option for large scale commercialization.

In one aspect, the features of an organic-inorganic hybrid polymer latex are to be used in traffic marking paints, wherein the polymer latex may include an organic fraction composed of polymer wherein the total solid content of constituent ingredients is at least 45% w/w, are disclosed. The polymer latex may further include a modified inorganic component. The modified inorganic component may include an inorganic fraction, wherein the inorganic fraction is at least 50% of the modified inorganic component at any given instance. The inorganic fraction may be composed of nano-particulate dispersion of an oxide of a metalloid from Group 14 of the periodic table having 4 valence electrons in its p-orbital and such that the modified inorganic component in the said polymer latex is at least 0.4 parts per 100 parts by weight of the polymer. The said polymer latex may further comprise polyfunctional amines such as polyethyleneamine or polymerization products of aziridine or a combination thereof which comprise at least 2 parts per 100 parts by weight of the polymer. The said polymer latex may further possess a glass transition temperature between the range 0 degree Celsius to 60 degree Celsius and more preferably in the range of 15 degree Celsius and 35 degree Celsius.

In one aspect, the features of the process of obtaining an organic-inorganic hybrid polymer latex are to be used in traffic marking paints, wherein said process may include an initial step of preparing initial monomer mix pre-emulsion (Biphasic System A) in demineralized water of unsaturated organic compounds that contain a COOH group (carboxylic acid group), preferably of organic compounds with the general formula $CH_2$=CHCOOH including salts, esters, alkyl esters of the said compounds and with the use of conventional surface-tension reducing agents like detergents or emulsifiers or wetting agents, are disclosed. The said process may include a further step of preparing an initial modified inorganic component, which may include an inorganic fraction dispersion (Biphasic System B) by mixing the chemically or thermally modified nanoparticulate dispersion of oxide of an element having 4 electrons in its outer orbital in demineralized water. The said process may include a further step of preparing an initiator solution (Solution C) for polymerization by mixing a compound in demineralized water and adding at 82 degree Celsius wherein said compound through thermal generation of free radicals initiates the polymerization of the initial pre-emulsion. The said process may include in a further step—the addition of Solution C simultaneously with Biphasic System A and Biphasic System B at 82 Degree Celsius to a pre-formed Acrylic polymer latex used as external seed in a kettle charge comprising at least 33% solids of particle size of maximum 60 nm (Seed Latex D) to form Polymer latex E. The said process may include a further step of holding the mixture at 82-86 Degree Celsius for at least 30 minutes and subsequently partially cooling the Polymer latex E to 70 degree Celsius followed by the addition of a chaser catalyst system including a solution of Tertiary butyl hydroperoxide simultaneously with Sodium metabisulphite solution to allow traces of monomer to react. The process may further include a step of cooling the polymer latex Polymer latex E further to 45 degree Celsius followed by neutralization with ammonia to pH 9.5-10.5 and addition of at least 2 parts per 100 parts by weight of the polymer of polymerization products of aziridine or polyethyleneamine or a combination thereof as post-additives to result in final hybrid polymer latex (Polymer latex F).

In another aspect, the features of the process of obtaining an organic-inorganic hybrid polymer latex to be used in traffic marking paints, wherein said process may include alternative methods of nanoparticulate inorganic fraction (Biphasic System B) addition, and wherein said nanoparticulate inorganic fraction (Biphasic System B) may be added either through delayed addition technique or may be pre-mixed with the initial monomer mix pre-emulsion (Biphasic System A) or may be pre-added to the kettle charge before addition of the initial monomer mix pre-emulsion (Biphasic System A).

In another aspect, the features of the process of obtaining an organic-inorganic hybrid polymer latex to be used in traffic marking paints, wherein said process may include an initial step of preparing pure monomer mixture (Monophasic System A) of unsaturated organic compounds that contain the COOH group, preferably of organic compounds with the general formula $CH_2$=CHCOOH including salts, esters, alkyl esters of the said compounds and simultaneous addition of nanoparticulate inorganic fraction (Biphasic System B) with the use of conventional surface-tension reducing agents like detergents or emulsifiers or wetting agents, are disclosed.

In yet another aspect, the features of the process of obtaining an organic-inorganic hybrid polymer latex to be used in traffic marking paints, wherein the addition of the inorganic nano-particulate fraction may include charging said nano-particulate inorganic fraction to a monomer mix pre-emulsion as a separate feed simultaneously using delayed addition technique at 82 degree Celsius or may comprise addition of said nanoparticulate dispersion through the monomer mix pre-emulsion or may comprise addition of the said nanoparticulate dispersion in the initial reactor charge, are disclosed.

In one aspect, the features of an organic-inorganic hybrid polymer latex to be used in traffic marking paints, wherein the said polymer latex can be incorporated into either conventional traffic paint with lower wet film thickness application or can be incorporated into high durable paints with higher wet film thickness application, are disclosed.

In one aspect, the features of an organic-inorganic hybrid which results in homogenous integration and association of the inorganic moiety in the polymer by crosslinking and polymerization, are disclosed.

In one aspect, the features of an organic-inorganic hybrid polymer latex to be used in traffic marking paints, wherein the said polymer latex contains the modified inorganic component which may include at least 50% of inorganic fraction and which may be either added during the polymerization along with monomer mix pre-emulsion or separately at the end of the reaction, are disclosed.

In one aspect, the features of an organic-inorganic hybrid polymer latex to be used in traffic marking paints, wherein the said polymer latex has strong bonding properties to a plurality of substrates, possesses good water repelling properties, possesses mechanical strength to resist wet scrubbing, higher endurance to humid and wet weather conditions and has strong durability to retain physical appearance even after a considerable period of time, are disclosed.

In one aspect, the features of an organic-inorganic hybrid polymer latex to be used in traffic marking paints, wherein the said polymer latex has reduced no-pick-up time and tack-free time and is environmentally friendly and is easy to apply, are disclosed.

In one aspect, the features of method of application of a traffic marking paint comprising at least an organic-inorganic hybrid polymer latex, wherein said polymer latex comprises an organic fraction comprising at least 45% w/w solids per total ingredients of the polymer, a modified inorganic component comprising at any given instance at least 50% of inorganic fraction wherein said inorganic fraction may comprise nanoparticulate dispersion of an oxide of a metalloid from Group 14 of the periodic table having 4 valence electrons in its p-orbital and such that the modified inorganic component in the said polymer latex is at least 0.4 parts per 100 parts by weight of the polymer, and may further comprise polyfunctional amines like polyethyleneamine or polymerization products of aziridine or a combination thereof which comprise at least 2 parts per 100 parts by weight of the polymer, are disclosed.

Other features and advantages of the present invention will be apparent from the following detailed description of the invention which illustrates, by way of example, the principles of the invention.

BRIEF DESCRIPTION OF THE DRAWINGS

The detailed description is given with reference to the accompanying figure. In the figure, the left-most digit(s) of a reference number identifies the figure in which the reference number first appears. The same numbers are used throughout the drawings to refer like features and components. The figures provided hereinunder do not display terms such as Biphasic System A, Biphasic System B, Solution C, Seed latex D, Polymer latex E or Polymer latex F, which are used throughout the specification, and the figures should be read so as to refer to steps of the process for obtaining said hybrid polymer latex.

Figure 1A:
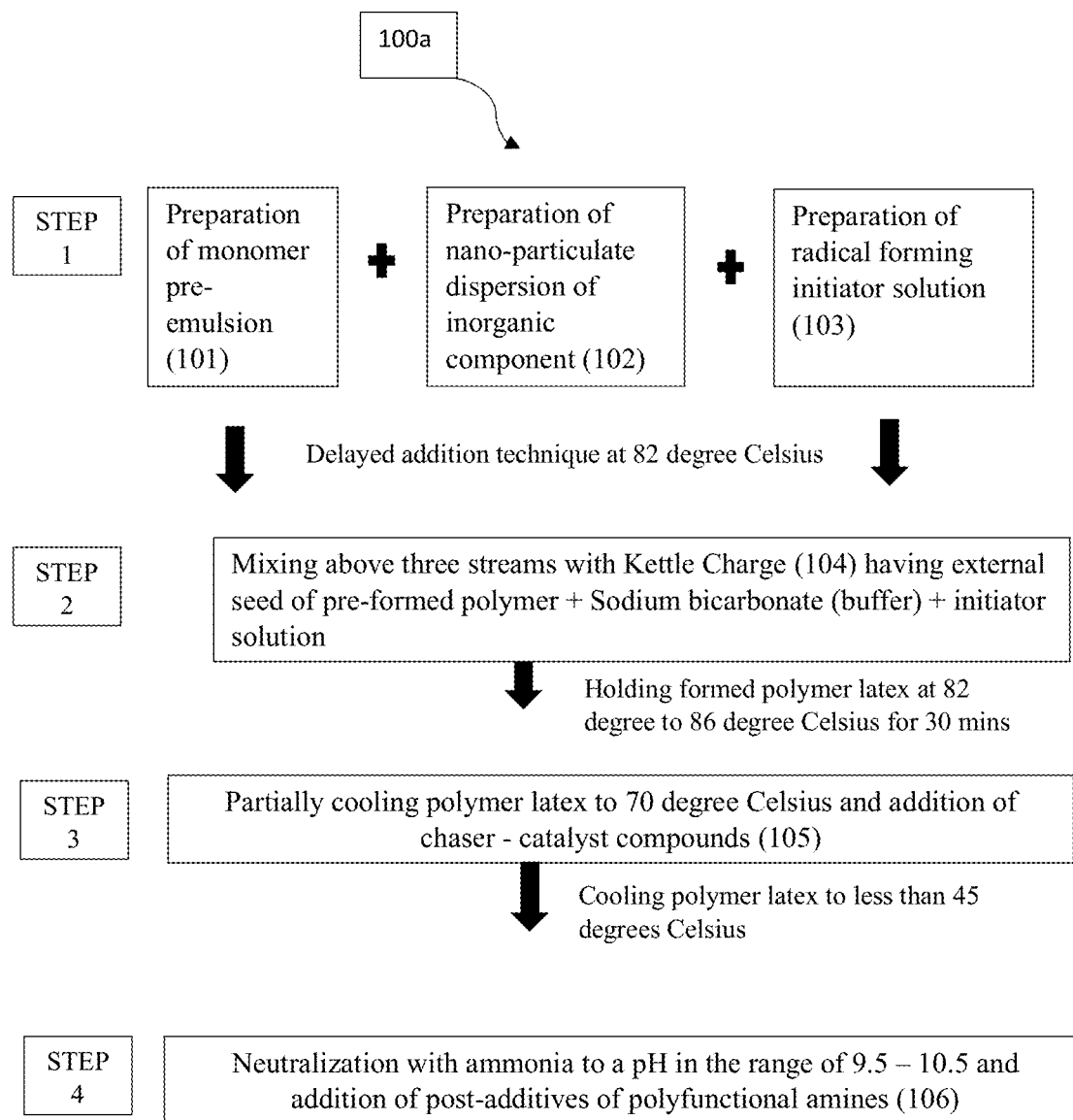
FIG. 1a (100a) illustrates an overview of the process for making an organic-inorganic hybrid polymer latex to be used in traffic marking paints wherein addition of inorganic component is through delayed addition technique in accordance with an embodiment of the present invention.

The figures depict embodiments of the present disclosure for purposes of illustration only. One skilled in the art will readily recognize from the following description that alternative embodiments of the steps illustrated herein may be employed without departing from the principles of the disclosure described herein.

DETAILED DESCRIPTION

The foregoing detailed description of embodiments is better understood when read in conjunction with the appended drawings. For the purpose of illustrating the disclosure, there are shown in the present document example constructions of the disclosure; however, the disclosure is not limited to the specific design disclosed in the document and the drawings.

The detailed description is provided with reference to the accompanying figures. In the figures, the left-most digit(s) of a reference number identifies the figure in which the reference number first appears. The same numbers are used throughout the drawings to refer like features and components.

The present invention is directed to provide an organic-inorganic hybrid polymer latex to be in traffic marking paints and process thereof. Traffic marking paints are applied to roads, parking lots, airports, shipping dockyards and the like, typically concrete and asphaltic surfaces, to instruct users and to demarcate traffic lanes, parking spaces, and the like. The production process of the polymer latex and the unique characteristics attributable to the latex is based addition technique for the modified inorganic component comprising an inorganic fraction as well as post addition of additives like polyethyleneamine or polymerization products of aziridine or combinations thereof.

In one of the embodiments, the invention relates to a coating composition which can be used more particularly for making traffic and road marking paints to be applied for a plurality of purposes including but not limited to roads, footpaths, railway crossings, airports, shipping dockyards etc. The coating composition may comprise of a mixture of a binder capable of being polymerized and crosslinked and comprising an organic material and an inorganic material. The said hybrid composition may contain at least 45% solids of the organic moieties used to make the coating composition and additionally may contain up to two additives which contribute to moisture proofing, water repellence and early water resistance of the resultant composition and the paint in which it is used.

In one embodiment, the invention relates to an organic—inorganic hybrid polymer coating composition wherein the organic fraction of polymer may contain the polymerization products of unsaturated organic compounds that contain the COOH group (a carboxylic acid group), more particularly organic compounds with the general formula $CH_2=CHCOOH$. Some of the organic compounds which can be incorporated within the hybrid polymer coating composition and which possess the general formula $CH_2=CHCOOH$ include but not limited to compounds like 2-propenoic acid, acrylic acid, vinylformic acid. Acrylic acid is a colorless liquid with a distinctive acrid odor. It has a flash point of 55° C., a boiling point of 141° C., a freezing point of 12° C., and prolonged exposure to fire or heat can cause polymerization making it an sought-after constituent of coating compositions and the present invention relates to a composition which more particularly may comprise esters, alkyl esters of acrylic acid, as well as any salts of acrylic acid including but not limited to aluminium salt, ammonium salt, calcium (2:1) salt, calcium (2:1) salt dehydrate, cobalt salt, ferrous salts, magnesium salt, potassium salt, silver salt, sodium salt, zinc salt, or any combinations thereof.

In another embodiment, the invention relates to an organic-inorganic hybrid polymer coating composition wherein the said composition may include self-polymerization products of such organic compounds as well as copolymers formed by the combination of said organic compounds and monomers of other compounds including but not limited to vinyl plastics such as polyvinyl chloride, polyvinyl acetate, vinyl chloride, polyvinyl acetals, vinyl acetate copolymers, styrene, vinyl acetate, butadiene, monovinyl acetylene polymers such as the neoprenes, particularly neoprene AC and neoprene AD, styrene-butadiene and similar copolymers, chlorinated rubber, and butyl rubber or any combination thereof.

In a preferred embodiment, the invention relates to an organic-inorganic hybrid polymer latex to be used in traffic marking paints wherein the said organic fraction may be an acrylic resin. The polymer may be prepared by conventional techniques known to those generally skilled in the art by the aqueous emulsion polymerization of ethylenically-unsaturated monomers and is selected at least from the group of organic compounds comprising of but not limited to Methyl-Methacrylate, Butyl Acrylate and (Meth)acrylic acid.

In an exemplary embodiment, the invention relates to an organic-inorganic hybrid polymer latex to be used in traffic marking paints wherein the said organic fraction is an acrylic resin and wherein the total solid content of the latex may be up to 60% solids weight/weight, preferably up to 55% solids weight/weight, or more preferably at any given point at least 45% solids based on the total weight of all ingredients.

In one embodiment, the invention relates to an organic-inorganic hybrid polymer latex to be used in traffic marking paints wherein the inorganic material in the said hybrid polymer latex may be an oxide of an element which is chemically inert and which can impart the traffic marking paints with a high degree of high-moisture resistance along with imparting other qualities like hardness, stability durability. Many metalloids known presently may suit the criteria and may comprise the inorganic fraction of the hybrid polymer latex to be used in traffic marking paints.

In an exemplary embodiment, the invention relates to an organic-inorganic hybrid polymer latex to be used in traffic marking paints wherein the modified inorganic component may comprise of a metalloid with four valence electrons in its p orbital and belonging to the group 14 elements of the periodic table. The modified inorganic component may comprise a total content in the range of 0.4 parts of modified inorganic component per 100 parts of polymer to 5 parts of modified inorganic component per 100 parts of polymer, more preferably in the range of 0.4 parts of modified inorganic component per 100 parts of polymer to 2 parts of modified inorganic component per 100 parts of polymer and at no given instance is less than 0.4 parts of modified inorganic component per 100 parts of polymer. At any given instance, the modified inorganic component may comprise at least 50% of inorganic fraction, wherein the inorganic fraction may comprise oxide of a metalloid with four valence electrons in its p orbital and belonging to the group 14 elements of the periodic table.

In one embodiment, the invention relates to an organic-inorganic hybrid polymer latex to be used in traffic marking paints wherein the modified inorganic component comprising oxide of a metalloid with four valence electrons in its p orbital and belonging to the group 14 elements of the periodic table may contain particles with varying size, distribution, shape and surface of the individual particles and further the said inorganic material may be made in a crystalline, amorphous or gel-like formulation. The size and distribution of particles play an important role in determination of hardness, resistance to weathering, durability, cost effectiveness, enhanced mechanical strength and abrasion resistance and other qualities. The metalloid particles making up the inorganic component may preferably be extremely small i.e. not more than 500 nm at any given point to facilitate equal distribution and potency of the polymer latex.

In an exemplary embodiment, the invention relates to an organic-inorganic hybrid polymer latex to be used in traffic marking paints wherein the modified inorganic component may comprise, at any given instance, an inorganic fraction, wherein the inorganic fraction may comprise an oxide of a metalloid with four valence electrons in its p orbital and belonging to the group 14 elements of the periodic table and wherein the inorganic fraction comprises particles with a size in the range 10 nm to 100 nm. The said modified nano-particulate dispersion of the inorganic component may be selected from a plurality of available commercial products of various elemental nano-particulate dispersions including but not limited to colloidal silica dispersion, fumed silica dispersion, Aerodisp W 7520 (aqueous dispersion of hydrophilic fumed silica), Aerodisp WR 8520 (aqueous dispersion of hydrophobic fumed silica) NanoBYK 3620 (surface treated silica Nanoparticle dispersion), or any combinations thereof.

Figure 1B:
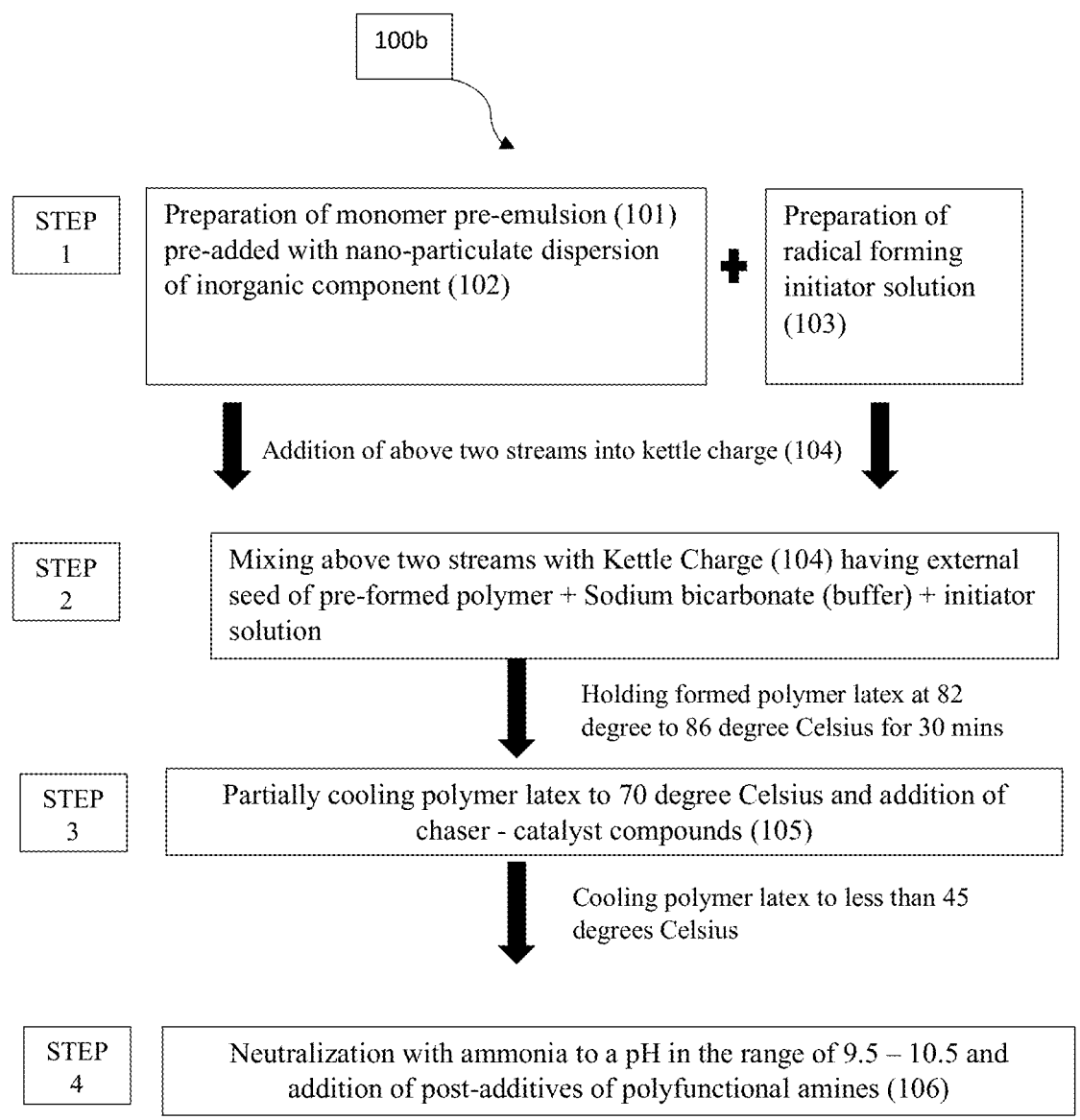
FIG. 1b (100b) illustrates an overview of the process for making an organic-inorganic hybrid polymer latex to be used in traffic marking paints wherein addition of inorganic component is simultaneously with the monomer mix pre-emulsion in accordance with an embodiment of the present invention.

Referring to FIG. 1, in one embodiment, the invention relates to an organic-inorganic hybrid polymer latex to be used in traffic marking paints wherein the process for preparation of said polymer latex may include in a first step preparation of a pre-emulsion of monomer mixture (101) of unsaturated organic compounds that contains the COOH group, preferably of organic compounds with the general formula $CH_2=CHCOOH$ including salts, esters, alkyl esters of the said compounds including but not limited to C1 to C24 alkyl esters of (meth)acrylic acid such as methyl (meth)acrylate; ethyl acrylate; butyl (meth)acrylate, lauryl (meth)acrylate, and stearyl (meth)acrylate; hydroxyethyl (meth)acrylate; hydroxypropyl (meth)acrylate; alkenes such as ethylene; dienes such as butadiene; styrene, alpha-methyl styrene; ring substituted styrenes; and (meth)acrylonitrile, allyl (meth)acrylate, diallyl phthalate, 1,4-butylene glycol dimethacrylate, 1,6-hexanediol diacrylate, and divinyl benzene, (meth)acrylamide; substituted (meth)acrylamides such as (meth)acrylamides with alpha-alkyl or aryl groups, or N-alkyl or aryl groups carboxylic acid monomers such as (meth)acrylic acid, itaconic acid, fumaric acid, crotonic acid, maleic acid, monomethyl itaconate, monomethyl fumarate, monobutyl fumarate, and maleic anhydride; sulfur containing acids such as 2-acrylamido-2-methyl-1-propanesulfonic acid and sodium vinyl sulfonate; and phosphorus containing acids such as 2-phosphoethyl (meth)acrylate or any combinations thereof. To form the monomer mix pre-emulsion, the said monomers are prepared in a dispersion medium which may preferably be demineralized water and with other essential elements like surfactants and chain transfer agents. Chain transfer reactions reduce the average molecular weight of the final polymer and the present invention discloses the use of mercaptans and more particularly Tertiarydodecylmercaptan as a preferred chain transfer agent. The primary role of surfactants in emulsion polymerization is to lower the interfacial tension, which allows the emulsification of reactive monomers and the formation of stable colloidal dispersions of nano-size polymer particles. Further, as a part of the first step, the process may include addition of a modified inorganic component comprising nano-particulate formulation (102) of the oxide of a metalloid with four valence electrons in its p orbital and belonging to the group 14 elements of the periodic table with a size in the range 10 nm to 100 nm. The said nano-particulate formulation may also be prepared using demineralized water as dispersion medium and may also be mixed with the monomer emulsion.

In another embodiment, the invention relates to an organic-inorganic hybrid polymer latex to be used in traffic marking paints wherein the process of addition of modified nano-particulate formulation of the inorganic component (102) of hybrid polymer comprising of the oxide of a metalloid with four valence electrons in its p orbital and belonging to the group 14 elements of the periodic table with a size in the range 10 nm to 100 nm as a part of the first step of the process may include a separate preparation of the nanoparticulate dispersion using demineralized water as a dispersion medium which is added to a pre-formed monomer mix pre-emulsion of unsaturated organic compounds that contain the COOH group, preferably of organic compounds with the general formula $CH_2=CHCOOH$ including salts, esters, alkyl esters of the said compounds.

Figure 1C:
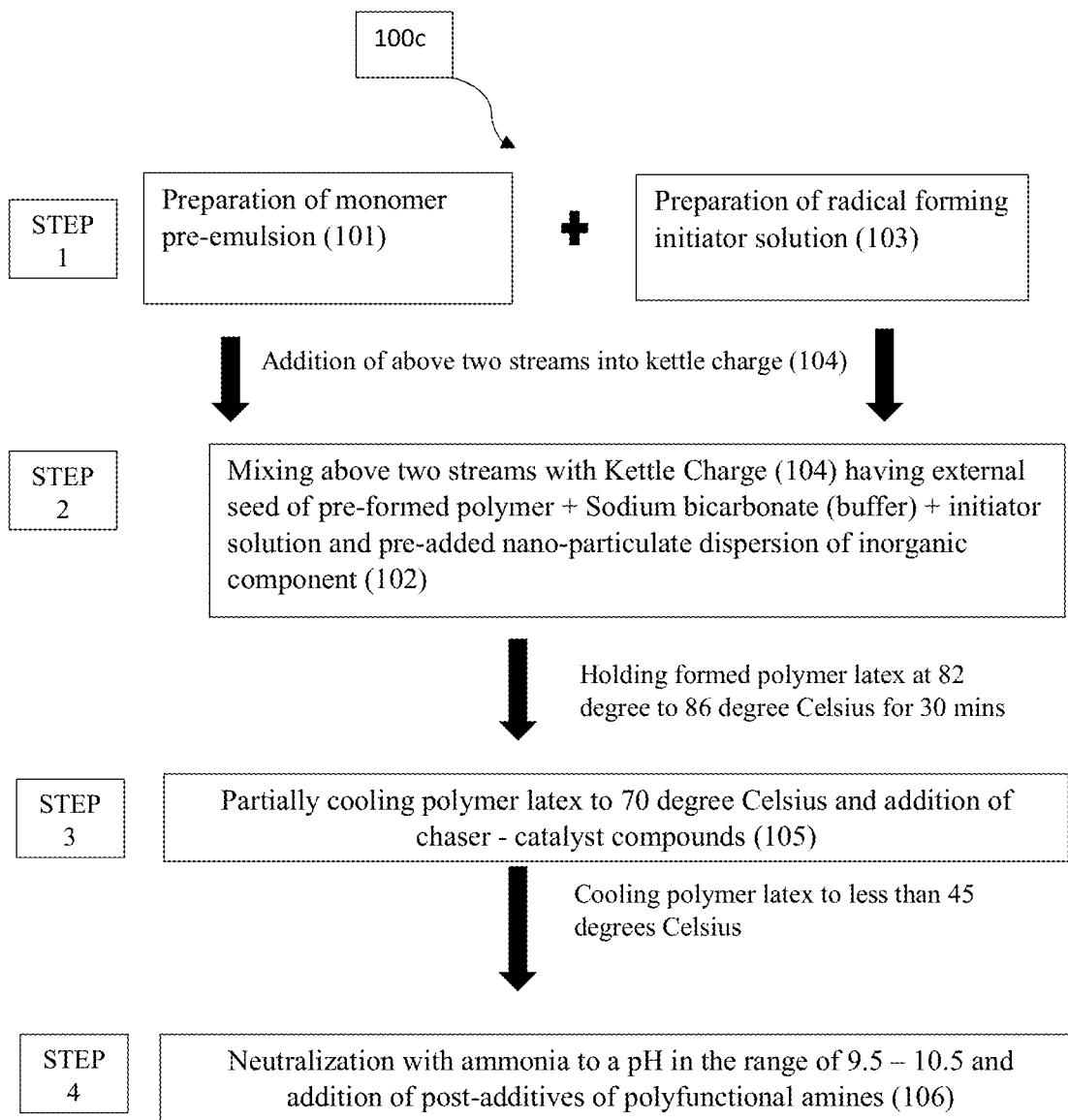
FIG. 1c (100c) illustrates an overview of the process for making an organic-inorganic hybrid polymer latex to be used in traffic marking paints wherein addition of inorganic component is through pre-addition in kettle charge in accordance with an embodiment of the present invention.

In an exemplary embodiment, the invention relates to an organic-inorganic hybrid polymer latex to be used in traffic marking paints wherein the process of addition of modified nano-particulate formulation of the inorganic component (102) of hybrid polymer comprising nanoparticulate dispersion of said component may be charged along with monomer mix pre-emulsion (101) as a separate feed simultaneously using delayed addition technique (FIG. 1a) at 82 degree Celsius or the said nanoparticulate dispersion may be added through the monomer mix pre-emulsion (FIG. 1b) or the said nanoparticulate dispersion may be pre-added in the initial reactor kettle charge (104) (FIG. 1c). The modified nanoparticulate dispersion may be prepared by chemical or thermal modification and may include a plurality of existing commercial products including but not limited to colloidal silica dispersions, fumed silica dispersions, Aerodisp W 7520 (aqueous dispersion of hydrophilic fumed silica), Aerodisp WR 8520 (aqueous dispersion of hydrophobic fumed silica), NanoBYK 3620 (surface treated silica Nanoparticle dispersion) or any combinations thereof.

In one embodiment, the invention relates to an organic-inorganic hybrid polymer latex to be used in traffic marking paints wherein the initial step of the process for preparation of said latex may include preparation of initial pure monomer pre-emulsion (101) (Monophasic System A) in demineralized water of unsaturated organic compounds that contain the COOH group, preferably of organic compounds with the general formula $CH_2=CHCOOH$ including salts, esters, alkyl esters of the said compounds and with the use of conventional surface-tension reducing agents like detergents or emulsifiers or wetting agents.

In one embodiment, the invention relates to an organic-inorganic hybrid polymer latex to be used in traffic marking paints wherein the process for preparation of said polymer latex may include in a subsequent second step preparing an initiator solution (103) comprising modified nanoparticulate dispersion of inorganic component (102) obtained in the first step, organic monomer mix pre-emulsion (101) obtained in the first step and a compound which may through thermal generation of free radicals initiate the polymerization of the initial monomer mix pre-emulsion. Such a compound may be selected from a plurality of radical generating compounds known in the present state of art and may optionally be ions or compounds containing the anions $SO_4^{2-}$ or $S_2O_8^{2-}$. The said process for polymerization through thermal activation of free radical formation may be performed at a temperature of less than 100 degree Celsius and more preferably at a temperature of 82 degree Celsius. The said process in the said second step may include addition of a pre-existing polymer seed (external seed) in kettle charge (104) comprising pre-formed polymers of organic compounds that contain the COOH group, preferably of organic compounds with the general formula $CH_2=CHCOOH$ including salts, esters, alkyl esters of the said compounds wherein said external seed may contain components with a particulate size not more than 60 nm and preferably comprise at least 33% solids.

In one embodiment, the invention relates to an organic-inorganic hybrid polymer latex to be used in traffic marking paints wherein polymerization of monomers can be carried out in presence of surface active agents using Thermal or Redox initiation system. The reaction temperature is maintained at a temperature lower than 100 Degree Celsius. Preferred is a reaction temperature between 40-95 Degree Celsius, more preferably between 76 and 88 Degree Celsius.

In an exemplary embodiment, the invention relates to an organic-inorganic hybrid polymer latex to be used in traffic marking paints wherein the process for preparation of said polymer latex may include in a second step preparing an initiator solution (103) of a compound including but not limited to persulfate solution in demineralized water for thermal activation of polymerization process along with said modified nanoparticulate dispersion of inorganic compounds (102), said monomer mix pre-emulsion (101) obtained in the first step and a preformed acrylic polymer latex as external seed in kettle charge (104) comprising at least 33% solids and particle size not more than 60 nm and wherein said additions are carried on at a temperature preferably of 82 degree Celsius and further holding the said polymer latex at 82 degree to 86 degree Celsius for a period of at least 30 mins to form the Polymer latex.

In one embodiment, the invention relates to an organic-inorganic hybrid polymer latex to be used in traffic marking paints wherein the process for preparation of said polymer latex may include in a subsequent third step ensuring that trace monomers have also completely reacted and polymerized. The said third step thus involves addition of a chaser compound and catalyst compound together (chaser-catalyst) system (105) after cooling the polymer latex of step two. The chaser catalyst system used in the present invention may comprise of a solution of a salt of an inorganic compound of the chemical formula $S_2O_5$ including but not limited to a sodium salt of said inorganic compound and a radical polymerization oxidation initiator which may comprise a branched tertiary molecule of a peroxide at a suitable concentration.

In an exemplary embodiment, the invention relates to an organic-inorganic hybrid polymer latex to be used in traffic marking paints wherein the process for preparation of said polymer latex may include in a third step cooling the Polymer latex of step two to 70 degree Celsius followed by addition of a chaser-catalyst system (105) which may comprise sodium metabisulphite and tertiary butyl hydroperoxide in a 70% aqueous solution to allow traces of monomer if any to react and polymerize.

In one embodiment, the invention relates to an organic-inorganic hybrid polymer latex to be used in traffic marking paints wherein the process for preparation of said polymer latex may include in a subsequent fourth step cooling the completely polymerized polymer latex to 45 degree Celsius followed by neutralization with ammonia to a pH in the range of 9.5-10.5 and addition of at least 2 parts per 100 parts of polymer by weight of post-additives (106) which improve certain properties in the coating composition like moisture proofing, water repellence and early water resistance of the resultant composition and the paint in which it is used. The post additives (106) may comprise typical polyethyleneimines like Lupasol G 20, Lupasol G 35, Montrek PET 6, Montrek PEI 18, Epomin SP 003, Epomin SP 006, Epomin SP 012, Epomin SP 018, Corcat P12, Corcat P18 or any combinations thereof. The said post additive may further comprise polyfunctional amines comprising polymerization products prepared from dimethylaminoethyl acrylate or methacrylate, beta-aminoethyl acrylate or methacrylate, N-beta-aminoethyl acrylamide or methacrylamide, N-(monomethylaminoethyl)-acrylamide or methacrylamide, N-(mono-n-butyl)-4-25 aminobutyl acrylate or methacrylate, methacryloxyethoxyethylamine, or acryloxypropoxypropoxypropylamine, 2-[4-(2,6-dimethylheptylidene)-amino]-ethyl methacrylate, 3-[2-(4-methylpentylidine)-amino]-propyl methacrylate, beta-(benzylideneamino)-ethyl methacrylate; 2-[4-(2,6-dimethylheptylidene)-amino]-ethyl acrylate; 12-(cyclopentylidene-amino)-dodecyl methacrylate, N-(1,3-dimethylbutylidene)-2-(2-methacryloxyethoxy)-ethylamine, N-(benzylidene)-methacryloxyethoxyethylamine, N-(1,3-dimethylbutylidene)-2-(2-acryloxyethoxy)-ethylamine, or any combinations thereof.

In an exemplary embodiment, the invention relates to an organic-inorganic hybrid polymer latex to be used in traffic marking paints wherein the process for preparation of said polymer latex may include in a fourth and final step addition of at least 2 part per 100 parts by weight of the polymer of polyfunctional amines (106) like polyethyleneamine or polymerization to products of aziridine or polyethyleneamine or a combination thereof as post-additives at pH of 9.5 to 10.5 after ammonia neutralization to result in final organic-inorganic hybrid polymer coating composition.

In one embodiment, the invention relates to an organio-inorganic hybrid polymer latex to be used in traffic marking paints wherein the said polymer has properties which are suitable for application in high durable paint or conventional paint. The application of the paint also is related to another parameter called wet film thickness. Wet film thickness is the thickness of wet paint or any coating film that is liquid based. Measuring wet film thickness is necessary to identify the amount of material that needs to be applied to achieve a particular dry film thickness that will give the best protection against damage, wear and corrosion. Wet thickness is at its peak right after the application of coating. It decreases once volatiles and solvents from the coating film undergo evaporation. The present invention discloses an organic-inorganic hybrid polymer latex to be used in traffic marking paints wherein said polymer may be incorporated in a traffic marking paint and may be used for high durable paints with a wet film thickness of 750 micron or may be used for conventional traffic paints with a wet film thickness of up to 500 micron.

In one embodiment, the invention relates to an organio-inorganic hybrid polymer latex to be used in traffic marking paints wherein the said polymer may possess superior durability, longevity, scrub resistance, rain and moisture proof properties, higher tolerance for humidity and other such characteristics as gauged by various standard evaluation systems. American Society for Testing and Materials (ASTM), is an international standards organization that develops and publishes voluntary consensus technical standards for a wide range of materials, products, systems, and services. One of such characteristics is the Wet Scrub Resistance Test and the ASTM has developed a standard method for its evaluation in ASTM D2486. These test methods cover a procedure for determining the resistance of wall paints to erosion caused by scrubbing, referred to herein after as "scrub resistance". Another standard test for evaluating the durability and stability of the paint is the ASTM D711 for No Pick-Up Time Test. The method uses a wheel consisting of a metal cylinder with rubber O-rings. The wheel is rolled down a ramp over a freshly applied traffic paint film repeatedly until there is no transfer of paint to the rubber rings. The elapsed time from paint film application to point of no paint transfer is the no-pick-up time. A further standard for evaluating the resistance of the traffic paint to to humidity, rain, water corrosion etc. can be in the form of the Wet Cohesion Test. Time taken for paint film to dry sufficient enough to withstand pressure is recorded. The lesser the time required to dry the film, the better is cohesion. A paint film is cast with wet film thickness of 500 microns on a glass plate and allowed to dry at 24±1 Degree C., 65±5% relative humidity using a humidity chamber. Subsequently, a drop of distilled water is put on the paint film, and after waiting for 60 seconds, the paint film is twisted at the place where water drop was positioned, with thumb using approximate pressure of 4 kg. Paint should not show cracks/deformation. The time required for drying of the film is recorded as the Wet Cohesion Time.

In another embodiment, the invention relates to an organic-inorganic hybrid polymer latex to be used in traffic marking paints wherein the said polymer may contain a particle size ranging from 50 nm to 500 nm and more specifically may contain a particulate size ranging from 150 nm to 250 nm. The polymer particle size may be evaluated by the Brookhaven Particle Size Analyser using the principle of Dynamic Light Scattering.

In one embodiment, the invention relates to an organic-inorganic hybrid polymer latex to be used in traffic marking paints wherein the said polymer may provide in enhanced wet scrub resistance (ASTM D2486) in the range of a factor of 1.5 to 2.4 i.e. in the range of 3000 scrubs to more than 4800 scrubs due homogenous integration and association of the inorganic moiety in the polymer structure characterizing in that the test is conducted with 175 Micron applicator having 4 strips/abrasion media followed by 7 days curing at Room Temperature.

In one embodiment, the invention relates to an organic-inorganic hybrid polymer latex to be used in traffic marking paints wherein the said polymer may provide reduced no-pick up time (ASTM D711) in the range of 13 min to 20 min, characterizing in that the test is carried on 750 micron applicator with drying at 24±2° C. & 60±5% humidity, further rolled by 5 Kg roller with band of rubber and lastly checked for the time at which no paint adheres to the rubber band.

In one embodiment, the invention relates to an organic-inorganic hybrid polymer latex to be used in traffic marking paints wherein the said polymer may possess a Glass Transition Temperature (Tg) broadly in the range of 0 degree Celsius to 50 degree Celsius and more specifically in the range of 15 degree Celsius to 35 degree Celsius. The Tg is one of the most important properties of any latex and is the temperature region where the polymer transitions from a hard, glassy material to a soft, rubbery material and is of immense significance particularly for stability, durability and easy of application of hybrid polymers to be used in traffic markings.

Figure 2:
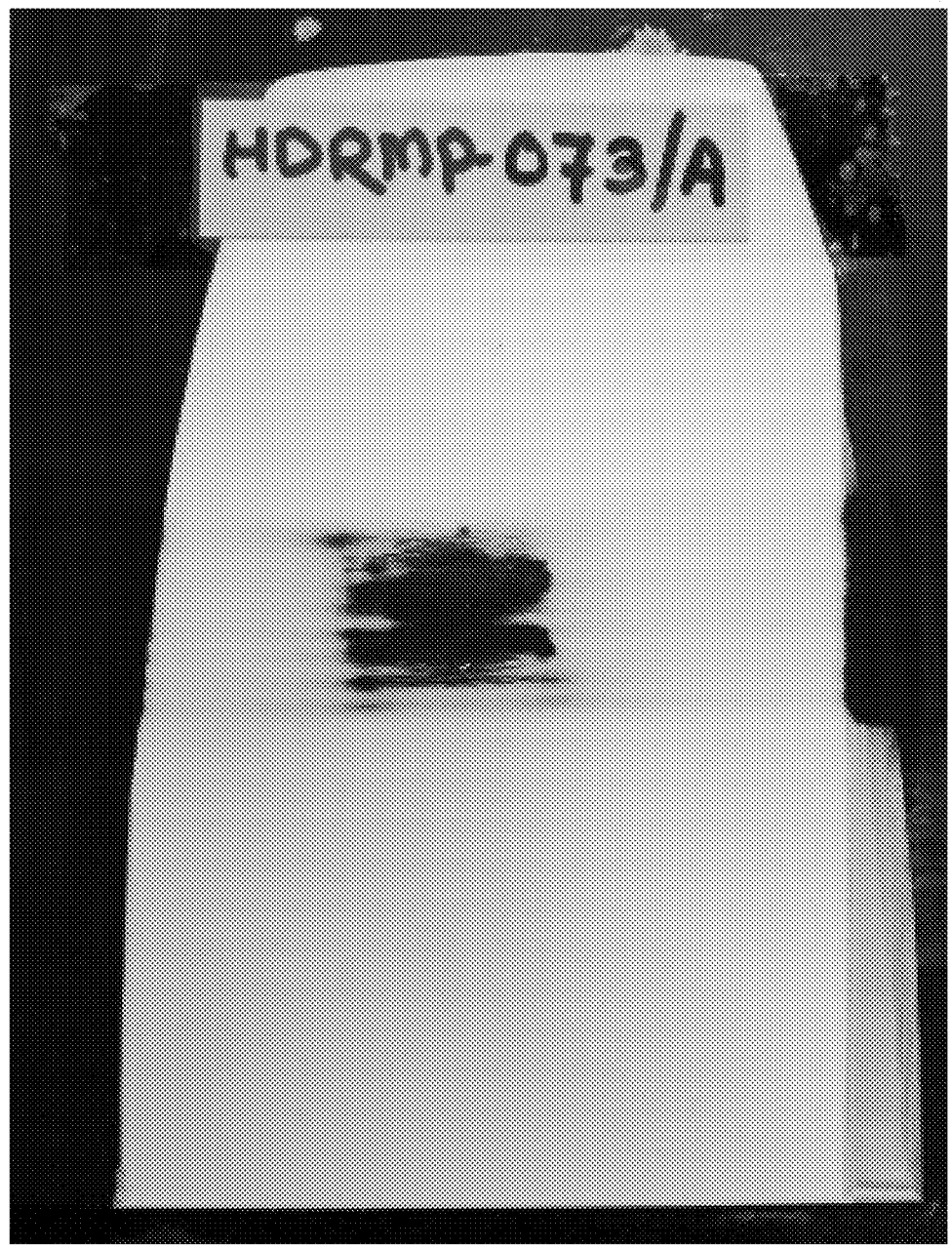
FIG. 2 illustrates wet scrub resistance test results for the double negative control polymer latex i.e. polymer latex without inorganic fraction as well as without polyfunctional amines in accordance with an embodiment of the present invention.

The following examples of the various embodiments may reveal a deeper understanding of the various properties of the organic-inorganic hybrid polymer latex to be used in traffic marking paints:

Example 1: Double Negative Control—[Ref. No. HDRMP-073A (FIG. 2)]—No Inorganic Component, No Polyfunctional Amine Additives Procedure:

To 200 g of demineralized water, 24 g of external acrylic polymer seed latex (solid content at least 33%, average particle diameter 50 nm) was added in a Glass reactor. 2.5 g of Sodium Bicarbonate was dissolved in 50 g of Demineralized water and added to the reactor. The contents were heated to 82 degree Celsius followed by addition of 20 g of 2% solution of potassium persulphate in demineralized water to reactor. The following two feeds were added over a period of 3 hours: 1) Monomer mix pre-emulsion as mentioned in Table 1A and 2) 100 g of 2% solution of Potassium Persulphate in demineralized water.

TABLE 1A

| Ingredient | Weight in grams |
| --- | --- |
| Demineralized water | 300 |
| Sodium Lauryl Sulphate | 5 |
| Methyl Methacrylate | 380 |
| Butyl Acrylate | 345 |
| Methacrylic Acid | 8 |

At the end of feed of monomer mix pre-emulsion and initiator solution, the contents of the reactor were held at 82 degree Celsius for 1 hour, then partially cooled to 70 degree Celsius and 0.6 g of Tertiary Butyl Hydroperoxide with 3 g of demineralized water was added separately & simultaneously with a solution of 0.4 g of sodium metabisulphite in 10 g of Demineralized water. The polymer latex formed was held for 1 hour at 68-70 degree Celsius to allow reaction of traces of monomer. Further, the polymer latex was cooled below 40 Degree Celsius and 15 g of 25% Ammonium Hydroxide solution was added to provide final pH of 9.8-10.2. A solution of 1.5 g of Acticide SPX preservative in 5 g of water was added to the polymer latex for in-can preservation. The resulting polymer latex has the following properties contained in Table 1B:

TABLE 1B

| Parameters | Value |
| --- | --- |
| Total Solid Content | 50.5% w/w |
| Particle Size (diameter) | 161 nm |
| Molecular Weight of the Polymer (Mw) | 245,000 |
| Glass Transition Temperature Tg | 26 degree C. |
| Viscosity Rise in paint after 3 days at 55 Deg C. | 10% |
| No Pick Up Time - On glass plate, 750 micron, drying @25° C./60% humidity, roll 5 Kg roller with rubber band, check for the time at which no paint adheres to the rubber band | 38 min |
| Wet Scrub Resistance - 175 Micron applicator (4 strips/Abrasion Media), 7 days curing at RT | 2050 scrubs |
| Wet Cohesion Test | 154 minutes |

Figure 3:
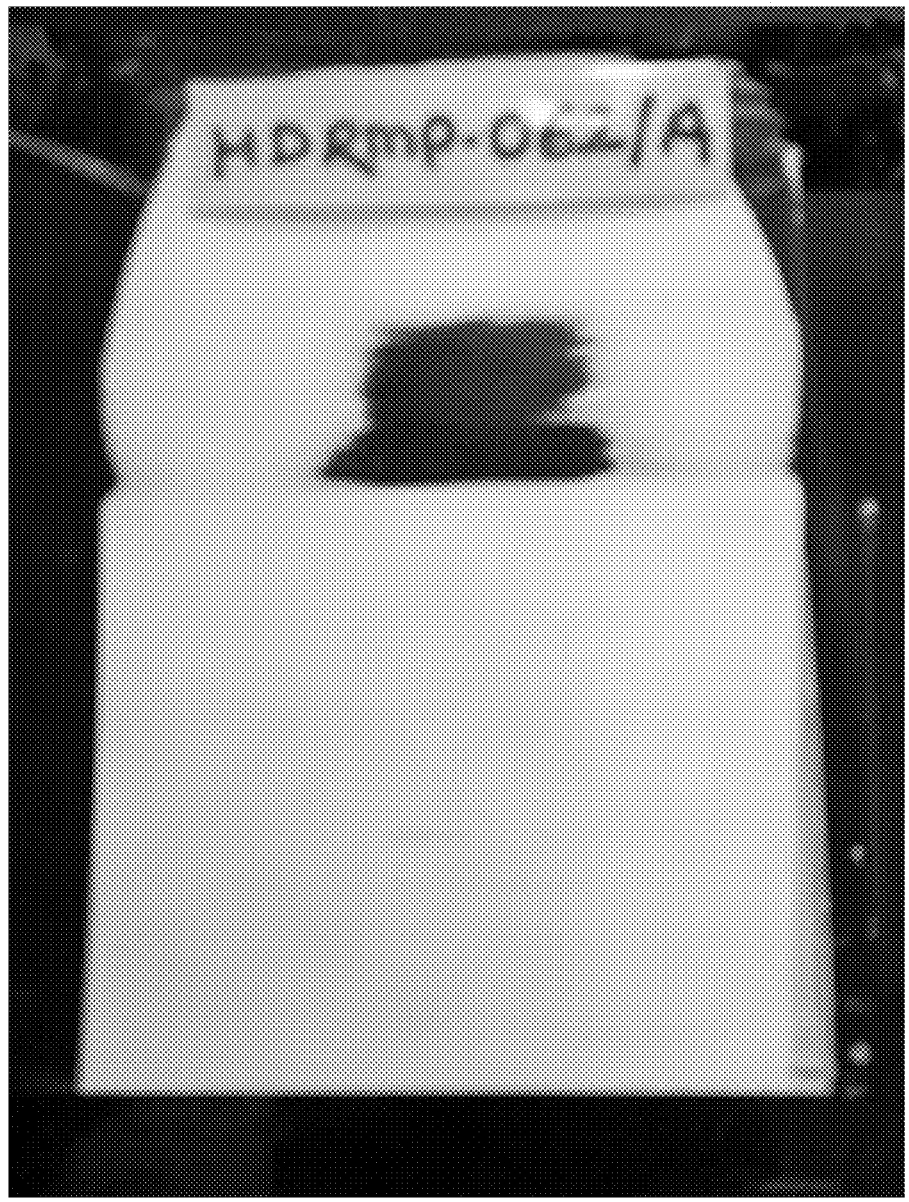
FIG. 3 illustrates wet scrub resistance test results for a polymer latex with no inorganic component but with presence of polyfunctional amines in accordance with an embodiment of the present invention.

Example 2: No Inorganic Component, Polyfunctional Amines Present [Ref. No. HDRMP-062A (FIG. 3)]

Procedure:

To 200 g of demineralized water, 24 g of external Acrylic polymer seed latex (solid content at least 33%, average particle diameter 50 nm) was added in a glass reactor. 2.5 g of sodium bicarbonate was dissolved in 50 g of demineralized water and added to the reactor. The contents were heated to 82 degree Celsius. Then 20 g of 2% solution of potassium persulphate in demineralized water was added to reactor. The following two feeds were added over a period of 3 hours: 1) Monomer mix pre-emulsion as mentioned in Table 2A, 2) 100 g of 2% solution of potassium persulphate in demineralized water

TABLE 2A

| Ingredient | Weight in grams |
| --- | --- |
| Demineralized water | 250 |
| Sodium Lauryl Sulphate | 5 |
| Methyl Methacrylate | 380 |
| Butyl Acrylate | 345 |
| Methacrylic Acid | 8 |

At the end of feed of monomer mix pre-emulsion and initiator solution, the contents of the reactor were held at 82 degree Celsius for 1 hour, then partially cooled to 70 degree Celsius and 0.6 g of tertiary butyl hydroperoxide with 3 g of demineralized water was added separately & simultaneously with a solution of 0.4 g of sodium metabisulphite in 10 g of demineralized water. The polymer latex formed was held for 1 hour at 68-70 degree Celsius to allow reaction of traces of monomer. Then the polymer latex was cooled below 40 degree Celsius and 15 g of 25% Ammonium Hydroxide solution was added to provide final pH of 9.8-10.5. A solution of polyethyleneamine—2 parts per 100 parts by weight of polymer is added to above polymer latex under stirring. To the polymer latex, Polyethyleneimine—1 part per 100 parts by weight of polymer is added under stirring. A solution of 1.5 g of Acticide SPX preservative in 5 g of water was added to the polymer latex for in-can preservation. The resulting polymer latex has the following properties contained in Table 2B:

TABLE 2B

| Parameters | Value |
| --- | --- |
| Total Solid Content | 50.8% w/w |
| Particle Size (diameter) | 202 nm |
| Molecular Weight of the Polymer (Mw) | 250,000 |
| Glass Transition Temperature (Tg) | 27 degree C. |
| Viscosity Rise in paint after 3 days at 55 Deg C. | 13% |
| No Pick Up Time - On glass plate, 750 micron, drying @25° C./60% humidity, roll 5 Kg roller with rubber band, check for the time at which no paint adheres to the rubber band | 18 min |
| Wet Scrub Resistance - 175 Micron applicator (4 strips/Abrasion Media), 7 days curing at RT | 2250 scrubs |
| Wet Cohesion Test | 113 minutes |

Figure 4:
FIG. 4 illustrates wet scrub resistance test results for a polymer latex with external addition of inorganic component and presence of polyfunctional amines in accordance with an embodiment of the present invention.

Example 3: External Addition of Inorganic Component, Polyfunctional Amines Present [Ref. No. HDRMP-076A (FIG. 4)]

Procedure:

To 200 g of demineralized water, 24 g of external acrylic polymer seed latex (solid content at least 33%, average particle diameter 50 nm) was added in a glass reactor. 2.5 g of sodium bicarbonate was dissolved in 50 g of demineralized water and added to the reactor. The contents were heated to 82 degree Celsius. Then 20 g of 2% solution of potassium persulphate in demineralized water was added to reactor. Following two feeds were added over a period of 3 hours: 1) monomer mix pre-emulsion as mentioned in Table 3A, and 2) 100 g of 2% solution of Potassium persulphate in demineralized water

TABLE 3A

| Ingredient | Weight in grams |
| --- | --- |
| Demineralized water | 250 |
| Sodium Lauryl Sulphate | 5 |
| Methyl Methacrylate | 380 |
| Butyl Acrylate | 345 |
| Methacrylic Acid | 8 |
| Modified nanoparticle dispersion of inorganic component | 1.5 parts by weight of polymer added externally |

At the end of feed of monomer mix pre-emulsion and initiator solution, the contents of the reactor were held at 82 degree Celsius for 1 hour, then partially cooled to 70 degree Celsius and 0.6 g of tertiary butyl hydroperoxide with 3 g of demineralized water was added separately & simultaneously with a solution of 0.4 g of sodium metabisulphite in 10 g of demineralized water. The polymer latex formed was held for 1 hour at 68-70 degree Celsius to allow reaction of traces of monomer Then the polymer latex was cooled below 40 degree Celsius and 15 g of 25% ammonium hydroxide solution was added to provide final pH of 9.8-10.5. A surface treated silica nanoparticle dispersion is added externally (1.5 parts by weight of polymer) to above polymer latex under stirring. A solution of polyethyleneamine—2 parts per 100 parts by weight of polymer is added to above polymer latex under stirring. To the polymer latex, Polyethyleneimine—1 part per 100 parts by weight of polymer is added under stirring. A solution of 1.5 g of Acticide SPX preservative in 5 g of water was added to the polymer latex for in-can preservation. The resulting polymer latex has the following properties contained in Table 3B:

TABLE 3B

| Parameters | Value |
| --- | --- |
| Total Solid Content | 51% w/w |
| Particle Size (diameter) | 175 nm |
| Molecular Weight of the Polymer (Mw) | 245,500 |
| Glass Transition Temperature (Tg) | 28 degree C. |
| Viscosity Rise in paint after 3 days at 55 Deg C. | 12% |
| No Pick Up Time - On glass plate, 750 micron, drying @25° C./60% humidity, roll 5 Kg roller with rubber band, check for the time at which no paint adheres to the rubber band | 18 min |
| Wet Scrub Resistance - 175 Micron applicator (4 strips/Abrasion Media), 7 days curing at RT | 2850 scrubs |
| Wet Cohesion Test | 100 minutes |

Figure 5:
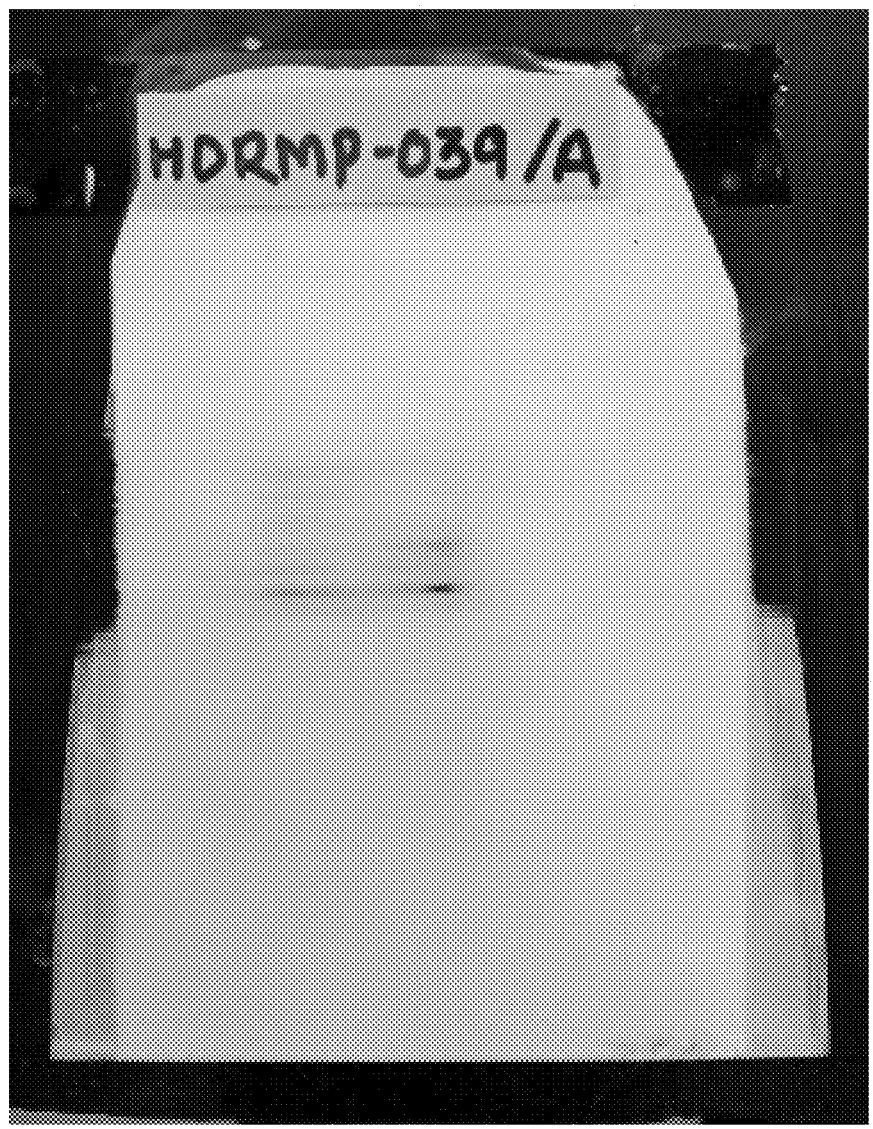
FIG. 5 illustrates wet scrub resistance test results for a polymer latex with addition of 1.5 parts of modified inorganic component per 100 parts of polymer during reaction and presence of polyfunctional amines in accordance with an embodiment of the present invention.

Example 4: 1.5 Parts Modified Inorganic Component Per 100 Parts by Weight of Polymer Added During Reaction, Polyfunctional Amines Present [Ref. No. HDRMP-039A (FIG. 5)]

Procedure:

To 200 g of demineralized water, 24 g of external acrylic polymer seed latex (solid content at least 33%, average particle diameter 50 nm) was added in a glass reactor. 2.5 g of sodium bicarbonate was dissolved in 50 g of demineralized water and added to the reactor. The contents were heated to 82 degree Celsius. Then 20 g of 2% solution of Potassium Persulphate in Demineralized water was added to reactor. Following three feeds were added over a period of 3 hours: 1) Monomer mix pre-emulsion as mentioned in Table 4A, 2) 100 g of 2% solution of potassium persulphate in demineralized water, 3) 1.5 part on hundred parts of polymer of surface treated silica nanoparticle dispersion diluted in 1:2 proportion with water

TABLE 4A

| Ingredient | Weight in grams |
| --- | --- |
| Demineralized water | 250 |
| Sodium Lauryl Sulphate | 5 |
| Methyl Methacrylate | 380 |
| Butyl Acrylate | 345 |
| Methacrylic Acid | 8 |
| Modified nanoparticle dispersion of inorganic component | 1.5 parts by weight of polymer added during reaction |

The pH during reaction and after completion of monomer mix pre-emulsion addition was in the range of 5-7. At the end of feed of monomer mix pre-emulsion and initiator solution, the contents of the reactor were held at 82 degree Celsius for 1 hour, then partially cooled to 70 degree Celsius and 0.6 g of tertiary butyl hydroperoxide with 3 g of demineralized water was added separately & simultaneously with a solution of 0.4 g of sodium metabisulphite in 10 g of demineralized water. The polymer latex formed was held for 1 hour at 68-70 degree Celsius to allow reaction of traces of monomer. Then the polymer latex was cooled below 40 degree Celsius and 15 g of 25% Ammonium Hydroxide solution was added to provide final pH of 9.8-10.5. A solution of PolyethyleneAmine—2 parts per hundred parts by weight of polymer is added to above polymer latex under stirring. To the polymer latex, Polyethyleneimine—1 part per 100 parts by weight of polymer is added under stirring. A solution of 1.5 g of Acticide SPX preservative in 5 g of water was added to the polymer latex for in-can preservation. The resulting polymer latex has the following properties contained in Table 4B:

TABLE 4B

| Parameters | Value |
| --- | --- |
| Total Solid Content | 50.45% w/w |
| Particle Size (diameter) | 160 nm |
| Molecular Weight of the Polymer (Mw) | 236,000 |
| Glass Transition Temperature (Tg) | 29 degree C. |
| Viscosity Rise in paint after 3 days at 55 Deg C. | 20% |
| No Pick Up Time - On glass plate, 750 micron, drying @25° C./60% humidity, roll 5 Kg roller with rubber band, check for the time at which no paint adheres to the rubber band | 15 min |

TABLE 4B-continued

| Parameters | Value |
| --- | --- |
| Wet Scrub Resistance - 175 Micron applicator (4 strips/Abrasion Media), 7 days curing at RT | 4800 scrubs |
| Wet Cohesion Test | 76 minutes |

Figure 6:
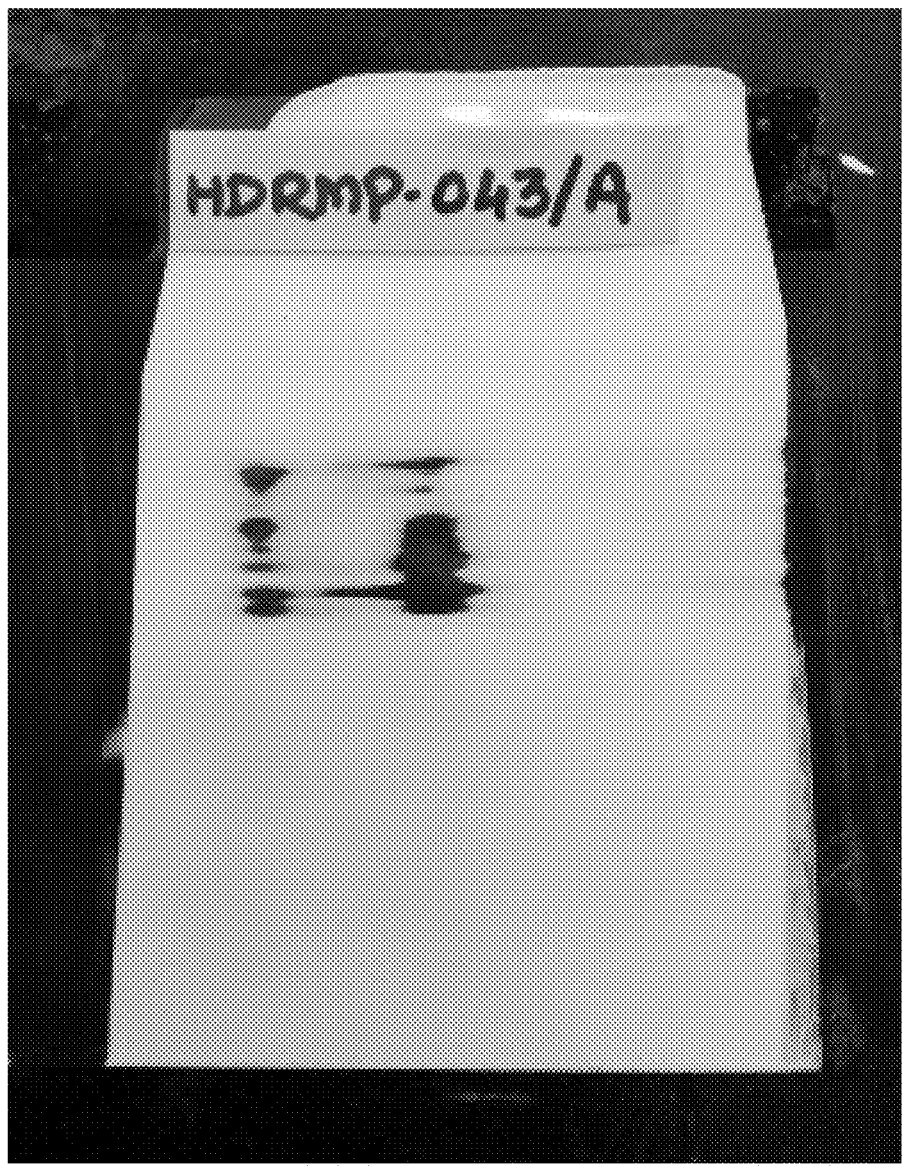
FIG. 6 illustrates wet scrub resistance test results for a polymer latex with addition of 0.75 parts of modified inorganic component per 100 parts of polymer during reaction and presence of polyfunctional amines in accordance with an embodiment of the present invention.

Example 5: 0.75 Parts Modified Inorganic Component Per 100 Parts by Weight of Polymer Added During Reaction Added During Reaction, Polyfunctional Amines Present [Ref. No. HDRMP-043A (FIG. 6)]

Procedure:

To 200 g of demineralized water, 24 g of external acrylic polymer seed latex (solid content at least 33%, average particle diameter 50 nm) was added in a glass reactor. 2.5 g of sodium bicarbonate was dissolved in 50 g of demineralized water and added to the reactor. The contents were heated to 82 degree Celsius.

Then 20 g of 2% solution of potassium persulphate in demineralized water was added to reactor.

Following three feeds were added over a period of 3 hours: 1) monomer mix Pre-emulsion as mentioned in Table 5A, 2) 100 g of 2% solution of potassium persulphate in Demineralized water and 3) 0.75 part on hundred parts of polymer of surface treated silica nanoparticle dispersion diluted in 1:2 proportion with water

TABLE 5A

| Ingredient | Weight in grams |
| --- | --- |
| Demineralized water | 250 |
| Sodium Lauryl Sulphate | 5 |
| Methyl Methacrylate | 380 |
| Butyl Acrylate | 345 |
| Methacrylic Acid | 8 |
| Modified nanoparticle dispersion of inorganic component | 0.75 parts by weight of polymer added during reaction |

The pH during reaction and after completion of monomer mix pre-emulsion addition was in the range of 5-7. At the end of feed of monomer mix pre-emulsion and initiator solution, the contents of the reactor were held at 82 degree Celsius for 1 hour, then partially cooled to 70 degree Celsius and 0.6 g of tertiary butyl hydroperoxide with 3 g of demineralized water was added separately & simultaneously with a solution of 0.4 g of sodium metabisulphite in 10 g of demineralized water. The polymer latex formed was held for 1 hour at 68-70 degree Celsius to allow reaction of traces of monomer. Then the polymer latex was cooled below 40 degree Celsius and 15 g of 25% ammonium hydroxide solution was added to provide final pH of 9.8-10.5. A solution of PolyethyleneAmine—2 parts per hundred parts by weight of polymer is added to above polymer latex under stirring. To the polymer latex, polyethyleneimine—1 part per 100 parts by weight of polymer is added under stirring. A solution of 1.5 g of Acticide SPX preservative in 5 g of water was added to the polymer latex for in-can preservation. The resulting polymer latex has the following properties contained in Table 5B:

TABLE 5B

| Parameters | Value |
| --- | --- |
| Total Solid Content | 50.2% w/w |
| Particle Size (diameter) | 205 nm |
| Molecular Weight of the Polymer (Mw) | 268,325 |
| Glass Transition Temperature (Tg) | 27 degree C. |
| Viscosity Rise in paint after 3 days at 55 Deg C. | 27% |
| No Pick Up Time - On glass plate, 750 micron, drying @25° C./60% humidity, roll 5 Kg roller with rubber band, check for the time at which no paint adheres to the rubber band | 15 min |
| Wet Scrub Resistance - 175 Micron applicator (4 strips/Abrasion Media), 7 days curing at RT | 3160 scrubs |
| Wet Cohesion Test | 85 minutes |

Figure 7:
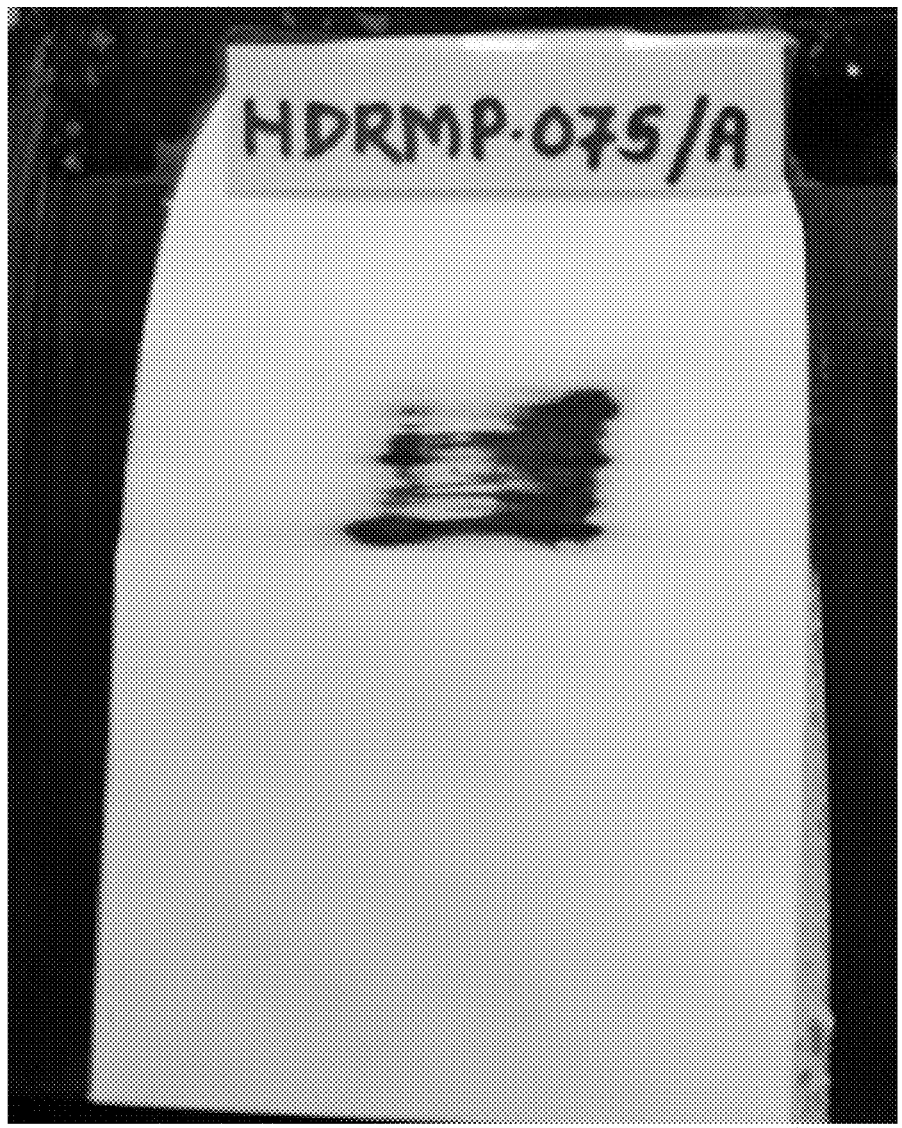
FIG. 7 illustrates wet scrub resistance test results for a polymer latex with addition of 1 parts of modified inorganic component per 100 parts of polymer during reaction and presence of polyfunctional amines in accordance with an embodiment of the present invention.

Example 6: 1 Parts Modified Inorganic Component Per 100 Parts by Weight of Polymer Added During Reaction Added During Reaction, Polyfunctional Amines Present [Ref. No. HDRMP-075A (FIG. 7)]

Procedure:

To 200 g of demineralized water, 24 g of external acrylic polymer seed latex (solid content at least 33%, average particle diameter 50 nm) was added in a Glass reactor. 2.5 g of Sodium Bicarbonate was dissolved in 50 g of demineralized water and added to the reactor. The contents were heated to 82 degree Celsius. Then 20 g of 2% solution of potassium persulphate in demineralized water was added to reactor. Following three feeds were added over a period of 3 hours: 1) monomer mix pre-emulsion as mentioned in Table 6A, 2) 100 g of 2% solution of potassium persulphate in demineralized water, 3) 1 part on hundred parts of polymer of Surface Treated silica Nanoparticle Dispersion diluted in 1:2 proportion with water

TABLE 6A

| Ingredient | Weight in grams |
| --- | --- |
| Demineralized water | 250 |
| Sodium Lauryl Sulphate | 5 |
| Methyl Methacrylate | 380 |
| Butyl Acrylate | 345 |
| Methacrylic Acid | 8 |
| Modified nanoparticle dispersion of inorganic component | 1 parts by weight of polymer added during reaction |

The pH during reaction and after completion of monomer mix pre-emulsion addition was in the range of 5-7. At the end of feed of monomer mix pre-emulsion and initiator solution, the contents of the reactor were held at 82 degree Celsius for 1 hour, then partially cooled to 70 degree Celsius and 0.6 g of Tertiary Butyl Hydroperoxide with 3 g of demineralized water was added separately & simultaneously with a solution of 0.4 g of sodium metabisulphite in 10 g of demineralized water. The polymer latex formed was held for 1 hour at 68-70 degree Celsius to allow reaction of traces of monomer. Then the polymer latex was cooled below 40 degree Celsius and 15 g of 25% Ammonium Hydroxide solution was added to provide final pH of 9.8-10.5. A solution of polyethyleneAmine—2 parts per hundred parts by weight of polymer is added to above polymer latex under stirring. To the polymer latex, polyethyleneimine—1 part per 100 parts by weight of polymer is added under stirring. A solution of 1.5 g of Acticide SPX preservative in 5 g of water was added to the polymer latex for in-can preservation. The resulting polymer latex has the following properties contained in Table 6B:

TABLE 6B

| Parameters | Value |
| --- | --- |
| Total Solid Content | 50.75% w/w |
| Particle Size (diameter) | 174 nm |
| Molecular Weight of the Polymer (Mw) | 239,300 |
| Glass Transition Temperature (Tg) | 27 degree C. |
| Viscosity Rise in paint after 3 days at 55 Deg C. | 17% |
| No Pick Up Time - On glass plate, 750 micron, drying @25° C./60% humidity, roll 5 Kg roller with rubber band, check for the time at which no paint adheres to the rubber band | 17 min |
| Wet Scrub Resistance - 175 Micron applicator (4 strips/Abrasion Media), 7 days curing at RT | 3375 scrubs |
| Wet Cohesion Test | 80 minutes |

Figure 8:
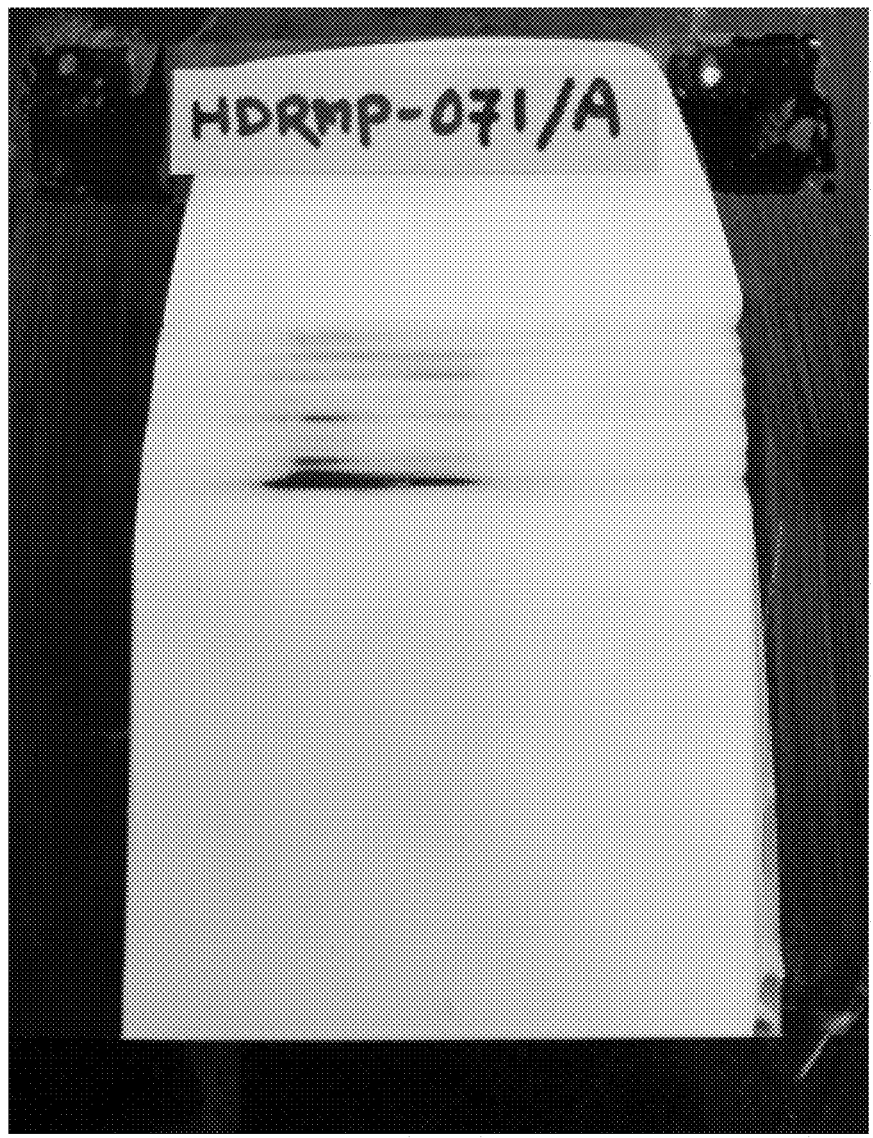
FIG. 8 illustrates wet cohesion test results for a polymer latex with addition of 1.25 parts of modified inorganic component per 100 parts of polymer during reaction and presence of polyfunctional amines in accordance with an embodiment of the present invention.

Example 7: 1.25 Parts Modified Inorganic Component Per 100 Parts by Weight of Polymer Added During Reaction Added, Polyfunctional Amines Present [Ref. No. HDRMP-071A (FIG. 8)]

Procedure:

To 200 g of demineralized water, 24 g of external acrylic polymer seed latex (solid content at least 33%, average particle diameter 50 nm) was added in a glass reactor. 2.5 g of sodium bicarbonate was dissolved in 50 g of demineralized water and added to the reactor. The contents were heated to 82 degree Celsius.

Then 20 g of 2% solution of potassium persulphate in demineralized water was added to reactor.

Following three feeds were added over a period of 3 hours: 1) monomer mix pre-emulsion as mentioned in Table 7A, 2) 100 g of 2% solution of potassium persulphate in demineralized water, 3) 1.25 part on hundred parts of polymer of surface treated silica nanoparticle dispersion diluted in 1:2 proportion with water.

TABLE 7A

| Ingredient | Weight in grams |
| --- | --- |
| Demineralized water | 250 |
| Sodium Lauryl Sulphate | 5 |
| Methyl Methacrylate | 380 |
| Butyl Acrylate | 345 |
| Methacrylic Acid | 8 |
| Modified nanoparticle dispersion of inorganic component | 1.25 parts by weight of polymer added during reaction |

The pH during reaction and after completion of monomer mix pre-emulsion addition was in the range of 5-7. At the end of feed of monomer mix pre-emulsion and initiator solution, the contents of the reactor were held at 82 degree Celsius for 1 hour, then partially cooled to 70 degree Celsius and 0.6 g of Tertiary Butyl Hydroperoxide with 3 g of demineralized water was added separately & simultaneously with a solution of 0.4 g of Sodium metabisulphite in 10 g of demineralized water. The polymer latex formed was held for 1 hour at 68-70 degree Celsius to allow reaction of traces of monomer. Then the polymer latex was cooled below 40 degree Celsius and 15 g of 25% Ammonium Hydroxide solution was added to provide final pH of 9.8-10.5. A solution of PolyethyleneAmine—2 parts per hundred parts by weight of polymer is added to above polymer latex under stirring. To the polymer latex, Polyethyleneimine—1 part per 100 parts by weight of polymer is added under stirring. A solution of 1.5 g of Acticide SPX preservative in 5 g of water was added to the polymer latex for in-can preservation. The resulting polymer latex has the following properties contained in Table 7B

TABLE 7B

| Parameters | Value |
| --- | --- |
| Total Solid Content | 50.52% w/w |
| Particle Size (diameter) | 186 nm |
| Molecular Weight of the Polymer (Mw) | 231,400 |
| Glass Transition Temperature (Tg) | 28 degree C. |
| Viscosity Rise in paint after 3 days at 55 Deg C. | 17% |
| No Pick Up Time - On glass plate, 750 micron, drying @25° C./60% humidity, roll 5 Kg roller with rubber band, check for the time at which no paint adheres to the rubber band | 15 min |
| Wet Scrub Resistance - 175 Micron applicator (4 strips/Abrasion Media), 7 days curing at RT | 3950 scrubs |
| Wet Cohesion Test | 83 minutes |

Figure 9:
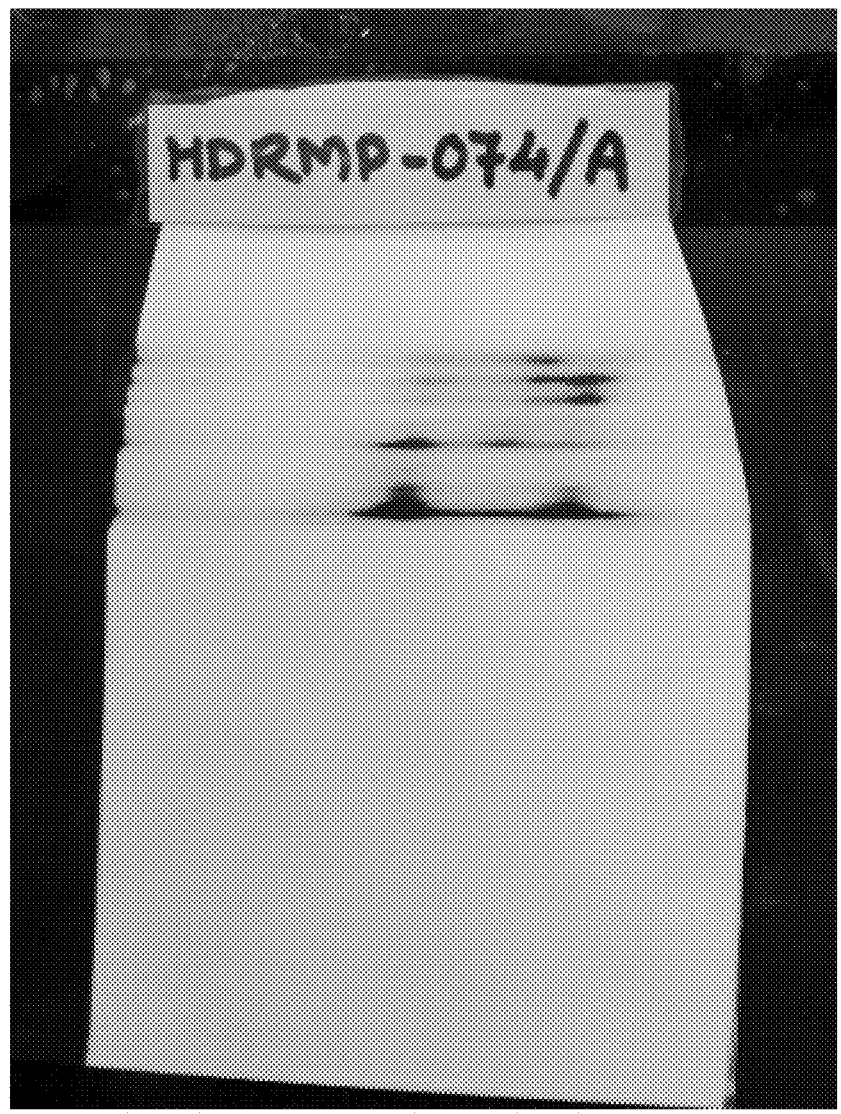
FIG. 9 illustrates wet scrub resistance test results for a polymer latex with addition of 0.75 parts of modified inorganic component per 100 parts of polymer during reaction but presence of only polyethyleneamine in accordance with an embodiment of the present invention.

Example 8: 0.75 Parts Modified Inorganic Component Per 100 Parts by Weight of Polymer Added During Reaction, Only Polyethyleneamine Added. [Ref. No. HDRMP-074A (FIG. 9)]

Procedure:

To 200 g of demineralized water, 24 g of external acrylic polymer seed latex (solid content at least 33%, average particle diameter 50 nm) was added in a glass reactor. 2.5 g of sodium bicarbonate was dissolved in 50 g of demineralized water and added to the reactor. the contents were heated to 82 degree Celsius. Then 20 g of 2% solution of potassium persulphate in demineralized water was added to reactor. Following three feeds were added over a period of 3 hours: 1) monomer mix pre-emulsion as mentioned in Table 8A, 2) 100 g of 2% solution of Potassium persulphate in Demineralized Water, 3) 0.75 part on hundred parts of polymer of surface treated silica nanoparticle dispersion diluted in 1:2 proportion with water

TABLE 8A

| Ingredient | Weight in grams |
| --- | --- |
| Demineralized water | 250 |
| Sodium Lauryl Sulphate | 5 |
| Methyl Methacrylate | 380 |
| Butyl Acrylate | 345 |
| Methacrylic Acid | 8 |
| Modified nanoparticle dispersion of inorganic component | 0.75 parts by weight of polymer added during reaction |

The pH during reaction and after completion of monomer mix pre-emulsion addition was in the range of 5-7. At the end of feed of monomer mix pre-emulsion and initiator solution, the contents of the reactor were held at 82 degree Celsius for 1 hour, then partially cooled to 70 degree Celsius and 0.6 g of Tertiary Butyl Hydroperoxide with 3 g of demineralized water was added separately & simultaneously with a solution of 0.4 g of Sodium metabisulphite in 10 g of demineralized water. The polymer latex formed was held for 1 hour at 68-70 degree Celsius to allow reaction of traces of monomer. Then the polymer latex was cooled below 40 degree Celsius and 15 g of 25% Ammonium Hydroxide solution was added to provide final pH of 9.8-10.5. A solution of PolyethyleneAmine—2 parts per hundred parts by weight of polymer is added to above polymer latex under stirring. A solution of 1.5 g of Acticide SPX preservative in 5 g of water was added to the polymer latex for in-can preservation. The resulting polymer latex has the following properties contained in Table 8B

TABLE 8B

| Parameters | Value |
| --- | --- |
| Total Solid Content | 50.7% w/w |
| Particle Size (diameter) | 197 nm |
| Molecular Weight of the Polymer (Mw) | 231,352 |
| Glass Transition Temperature (Tg) | 28 degree C. |
| Viscosity Rise in paint after 3 days at 55 Deg C. | 17% |
| No Pick Up Time - On glass plate, 750 micron, drying @25° C./60% humidity, roll 5 Kg roller with rubber band, check for the time at which no paint adheres to the rubber band | 15 min |
| Wet Scrub Resistance - 175 Micron applicator (4 strips/Abrasion Media), 7 days curing at RT | 3562 scrubs |
| Wet Cohesion Test | 110 minutes |

Figure 10:
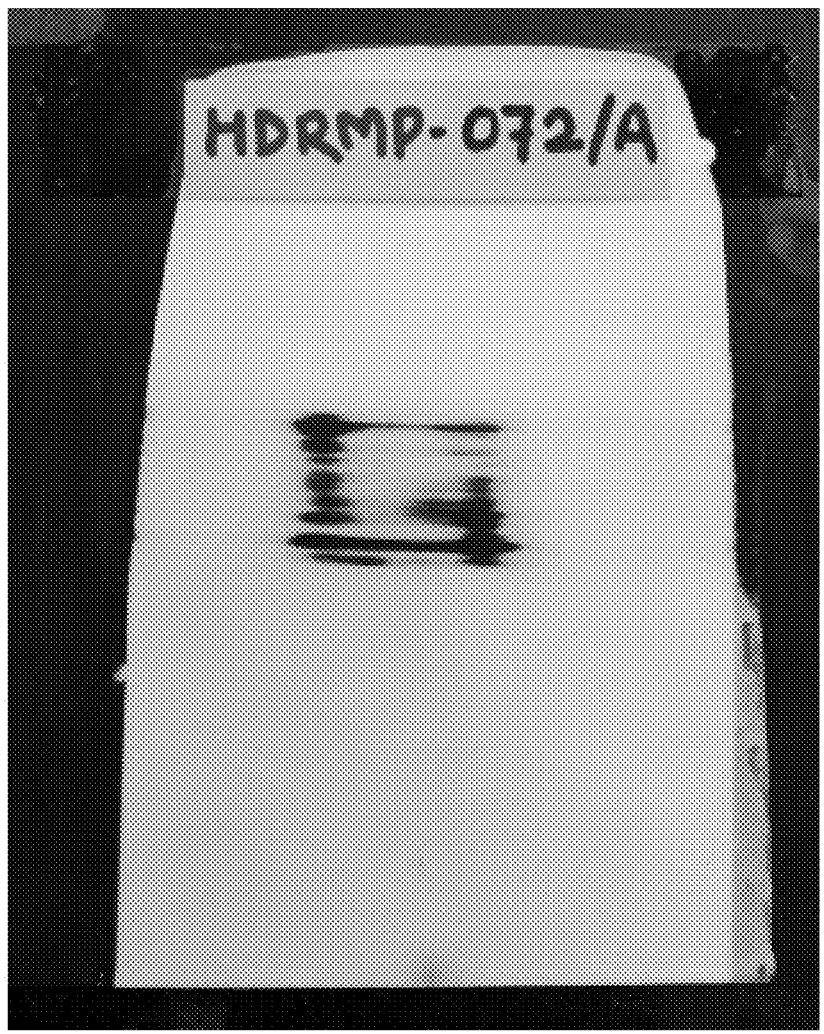
FIG. 10 illustrates wet scrub resistance test results for a polymer latex with addition of 0.75 parts of modified inorganic component per 100 parts of polymer during reaction but total absence of polyfunctional amines in accordance with an embodiment of the present invention.

Example 9: 0.75 Parts Modified Inorganic Component Per 100 Parts by Weight of Polymer Present, No Addition of Polyfunctional Amines [Ref No. HDRMP-072A (FIG. 10)]

Procedure:

To 200 g of demineralized water, 24 g of external acrylic polymer seed latex (solid content at least 33%, average particle diameter 50 nm) was added in a glass reactor. 2.5 g of sodium bicarbonate was dissolved in 50 g of demineralized water and added to the reactor. the contents were heated to 82 degree Celsius. Then 20 g of 2% solution of potassium persulphate in demineralized water was added to reactor. following three feeds were added over a period of 3 hours: 1) monomer mix pre-emulsion as mentioned in table 9A, 2) 100 g of 2% solution of potassium persulphate in demineralized water and 3) 0.75 part on hundred parts of polymer of surface treated silica nanoparticle dispersion diluted in 1:2 proportion with water

TABLE 9A

| Ingredient | Weight in grams |
| --- | --- |
| Demineralized water | 300 |
| Sodium Lauryl Sulphate | 5 |
| Methyl Methacrylate | 380 |
| Butyl Acrylate | 345 |
| Methacrylic Acid | 8 |
| Modified nanoparticle dispersion of inorganic component | 0.75 parts by weight of polymer added during reaction |

The pH during reaction and after completion of monomer mix pre-emulsion addition was in the range of 5-7. At the end of feed of monomer mix pre-emulsion and initiator solution, the contents of the reactor were held at 82 degree Celsius for 1 hour, then partially cooled to 70 degree Celsius and 0.6 g of Tertiary Butyl Hydroperoxide with 3 g of demineralized water was added separately & simultaneously with a solution of 0.4 g of sodium metabisulphite in 10 g of demineralized water. The polymer latex formed was held for 1 hour at 68-70 degree Celsius to allow reaction of traces of monomer. Then the polymer latex was cooled below 40 degree Celsius and 15 g of 25% Ammonium Hydroxide solution was added to provide final pH of 9.8-10.5. A solution of 1.5 g of Acticide SPX preservative in 5 g of water was added to the polymer latex for in-can preservation. The resulting polymer latex has the following properties contained in Table 9B

TABLE 9B

| Parameters | Value |
| --- | --- |
| Total Solid Content | 50.25% w/w |
| Particle Size (diameter) | 170 nm |
| Molecular Weight of the Polymer (Mw) | 373,662 |
| Glass Transition Temperature (Tg) | 28 degree C. |
| Viscosity Rise in paint after 3 days at 55 Deg C. | 20% |
| No Pick Up Time - On glass plate, 750 micron, drying @25° C./60% humidity, roll 5 Kg roller with rubber band, check for the time at which no paint adheres to the rubber band | 40 min |
| Wet Scrub Resistance - 175 Micron applicator (4 strips/Abrasion Media), 7 days curing at RT | 3100 scrubs |
| Wet Cohesion Test | 132 minutes |

In one embodiment, the invention relates to method of application of a high-durable traffic marking paint comprising at least an organic-inorganic hybrid polymer latex. The method of application may comprise applying on said road surface a traffic paint composition comprising at least a hybrid polymer latex in an aqueous evaporable carrier, wherein said hybrid polymer latex comprises: a) an organic fraction composed of a polymer wherein the total solid content of constituent ingredients is at least 45% w/w, b) a modified inorganic component comprising an inorganic fraction composed of nanoparticulate dispersion of an oxide of a metalloid from Group 14 of the periodic table having 4 valence electrons in its p-orbital, wherein the inorganic fraction in said latex is at least 0.4 parts per 100 parts by weight of polymer or more, and characterizing in that the hybrid polymer latex comprises homogenous integration and association of the inorganic moiety with the polymer, and c) polyfunctional amines like polyethyleneamine or polymerization products of aziridine or a combination thereof which is at least 2 parts per 100 parts by weight of the polymer, and characterizing in that said hybrid polymer latex a glass transition temperature between the range 0 degree Celsius to 60 degree Celsius and more preferably in the range of 15 degree Celsius and 35 degree Celsius. The method of application may further comprise evaporating said aqueous evaporable carrier to form said high-durable traffic marking on said road surface, characterizing in that, said high-durable traffic marking paint has no-pick up time estimated using ASTM D711 with 750 micron applicator in the range of 13 min to 20 min at 60±5% humidity, a no-pick up time estimated using ASTM D711 with 500 micron applicator in the range of 07 min to 11 min at 60±5% humidity, and a wet scrub resistance estimated using ASTM D2486 of up to 4800 scrubs.

In another embodiment, the invention relates to method of application of a high-durable traffic marking paint comprising at least an organic-inorganic hybrid polymer latex, wherein the method of application may comprise all equipment used for application of paints to be applied over concrete or masonry substrate, including but not limited to conventional spray equipment or equipment made of stainless steel, or airless spray gun or any combination thereof.

In another embodiment, the invention relates to method of application of a high-durable traffic marking paint comprising at least an organic-inorganic hybrid polymer latex, wherein the method of application may comprise paint ingredients including but are not limited to rheology modifiers, pigments, extenders, dispersing agents, wetting agents, freeze thaw stabilizers, coalescing agents, preservatives, defoaming agents, anti-foaming agents, drying agents, fast evaporating solvents, glass beads (reflectors) or any combination thereof.

In another embodiment, the invention relates to method of application of a high-durable traffic marking paint comprising at least an organic-inorganic hybrid polymer latex, wherein the method of application may comprise a step of evaporation of the volatile substance after application on road surface wherein, the pH of the composition may be lowered upon evaporation of the volatile base and further may be lowered to a point where the protonation of the polyamine and polyimine may commence and may render the polyamine or polyimine or a mixture thereof, cationic.

In another embodiment, the invention relates to method of application of a high-durable traffic marking paint comprising at least an organic-inorganic hybrid polymer latex, wherein the method of application may accelerate the paint-drying process by combining cationic polymer with anionically stabilized polymer emulsion.

Figure 11:
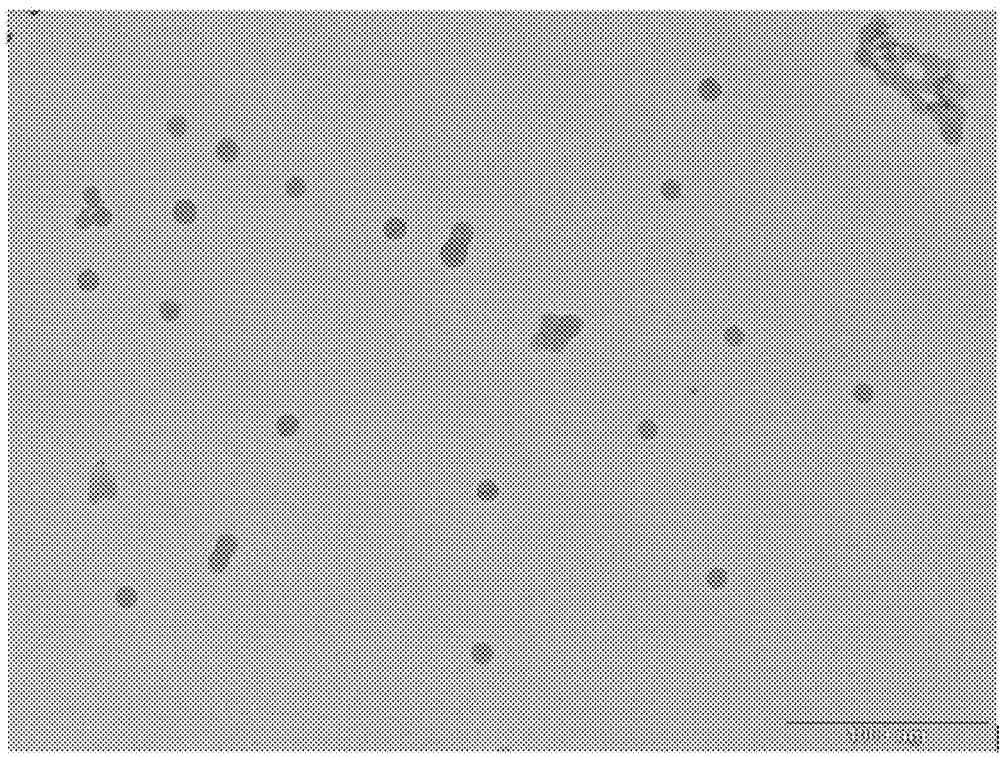
FIG. 11 illustrates Transmission Electron Microscopy (TEM) of hybrid polymer latex at a scale of 1000 nm.

Referring to FIG. 11, in one embodiment, the invention relates to an organic-inorganic hybrid polymer latex to be used in traffic marking paints wherein the latex comprises homogenous integration and association of the inorganic moiety in the polymer structure. The figure represents transmission electron microscopy results of the said polymer wherein polymer latex at a scale of 1000 nm is not agglomerated agglomerated and is homogenously integrated and associated with the polymer latex despite presence of at least 0.4 parts modified nano-particles of the inorganic fraction comprising an oxide of a metalloid from Group 14 of the periodic table having four valence electrons in its p-orbital per 100 parts of the polymer by weight.

The foregoing description shall be interpreted as illustrative and not in any limiting sense. A person of ordinary skill in the art would understand that certain modifications could come within the scope of this disclosure.

I claim:

1. A hybrid polymer latex comprising:
   a) an organic fraction comprising a polymer wherein the total solid contents of constituent ingredients are at least 45% w/w of the hybrid polymer latex,
   b) a modified inorganic component comprising at least 50% of an inorganic fraction comprising a nanoparticulate dispersion of an oxide of a metalloid from Group 14 of the periodic table having four valence electrons in its p-orbital, and wherein the modified inorganic component in said hybrid polymer latex is in an amount of at least 0.4 parts per 100 parts by weight of the polymer, the hybrid polymer latex comprises homogenous integration and association of the modified inorganic component with the organic fraction, and
   c) polyfunctional amines comprising polyethyleneamine, polymerization products of aziridine or a combination thereof wherein said polyfunctional amines are present at an amount of at least 2 parts per 100 parts by weight of the polymer, wherein:
   said hybrid polymer latex having a glass transition temperature ranging from 15 degrees Celsius to 35 degrees Celsius.

2. The hybrid polymer latex of claim 1, wherein said organic fraction comprises a polymerization product of unsaturated organic compounds that contain a COOH group, and wherein organic fraction comprises organic compounds having a general formula of $CH_2$=CHCOOH including salts, esters, and/or alkyl esters thereof, and wherein organic fraction further includes self-polymerization products of the organic compounds as well as copolymers formed by the combination of said organic compounds and monomers of other compounds comprising styrene, vinyl acetate, and/or butadiene.

3. The hybrid polymer latex of claim 2, wherein said organic compound comprises an acrylic resin comprising at least one of Methyl-Methacrylate, Butyl Acrylate and (Meth)acrylic acid.

4. The hybrid polymer latex of claim 1, wherein said inorganic fraction comprises a nanoparticulate dispersion of an oxide of the element selected at least from the group of metalloids occurring in Group 14 of the periodic table, and wherein said inorganic fraction is either thermally or chemically modified.

5. The hybrid polymer latex of claim 1, wherein said polyfunctional amines comprise a combination of polyethyleneamine and polymerization products of aziridine, wherein said polymerization products of aziridine comprise at least one polyalkyleneimine, the polyalkyleneimine comprising a linear polyethyleneimine, a branched polyethyleneimine, or a combination thereof.

6. The hybrid polymer latex of claim 1, wherein the composition comprises particles having a size ranging from 50 nm to 500 nm.

7. The hybrid polymer latex of claim 1, wherein said latex is a durable paint with a wet film thickness of 750 microns or is a traffic paint with a wet film thickness of up to 500 microns.

8. The hybrid polymer latex of claim 1, wherein said hybrid polymer latex provides wet scrub resistance (ASTM D2486) of up to 4800 scrubs with 175 micron applicator, and said hybrid polymer latex provides a no-pick up time (ASTM D711) in the range of 13 minutes to 20 minutes with 750 micron applicator, and said hybrid polymer latex provides wet cohesion between 76 minutes to 132 minutes at temperature of 24±2° C. and humidity of 65±5%.

* * * * *